United States Patent
Forster et al.

(10) Patent No.: US 10,977,965 B2
(45) Date of Patent: Apr. 13, 2021

(54) SMART SIGN BOX USING ELECTRONIC INTERACTIONS

(75) Inventors: Ian J. Forster, Essex (GB); David Welch, Somerset (GB); Haochuan Wang, S. Pasadena, CA (US); Sriram Venkatasanthanam, Chino Hills, CA (US); Steven R. Chapman, Glenview, IL (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 13/014,806

(22) Filed: Jan. 27, 2011

(65) Prior Publication Data

US 2011/0307309 A1 Dec. 15, 2011

Related U.S. Application Data

(60) Provisional application No. 61/299,609, filed on Jan. 29, 2010, provisional application No. 61/311,473, filed on Mar. 8, 2010, provisional application No. 61/416,384, filed on Nov. 23, 2010, provisional application No. 61/423,139, filed on Dec. 15, 2010.

(51) Int. Cl.
  *G09F 13/02* (2006.01)
  *G06Q 30/02* (2012.01)
  *G09F 13/04* (2006.01)

(52) U.S. Cl.
  CPC ............ *G09F 13/02* (2013.01); *G06Q 30/02* (2013.01); *G06Q 30/0241* (2013.01); *G09F 13/04* (2013.01)

(58) Field of Classification Search
  USPC ........... 705/27.2, 14.47, 14.58, 14.64, 14.26; 40/427, 541; 359/237; 370/389; 24/303; 340/10.1; 235/383
  See application file for complete search history.

(56) References Cited

U.S. PATENT DOCUMENTS

| | | | |
|---|---|---|---|
| 1,331,136 A | 2/1920 | Woodjard | |
| 5,083,111 A | 1/1992 | Drucker et al. | |
| 5,485,291 A | 1/1996 | Qiao | |
| 5,609,059 A | 3/1997 | McEwan | |
| 5,641,219 A | 6/1997 | Mizobe | |
| 5,648,613 A | 7/1997 | Kiefer | |
| 5,648,643 A | 7/1997 | Knowles et al. | |
| 5,720,123 A * | 2/1998 | Taylor | 40/454 |
| 5,841,350 A | 11/1998 | Appalucci et al. | |
| 5,867,017 A * | 2/1999 | Merwin et al. | 323/320 |

(Continued)

FOREIGN PATENT DOCUMENTS

| | | |
|---|---|---|
| BR | 0611910 | 2/2011 |
| CN | 1741862 | 3/2006 |

(Continued)

OTHER PUBLICATIONS

Jonathan W. Valvano, Embedded System, 2009 (Year: 2009).*

(Continued)

*Primary Examiner* — Tarek Elchanti

(57) ABSTRACT

The present invention relates to an advertising system and method of using the same. The advertising system includes a light source which may be activated by near field communication devices in order to extract information from the system.

20 Claims, 7 Drawing Sheets

(56) References Cited

U.S. PATENT DOCUMENTS

| | | |
|---|---|---|
| 5,921,674 A | 7/1999 | Koczi |
| 5,944,405 A | 8/1999 | Takeuchi |
| 5,945,938 A | 8/1999 | Chia et al. |
| 5,947,578 A | 9/1999 | Ayres |
| 6,142,375 A | 11/2000 | Belka et al. |
| 6,144,264 A | 11/2000 | Wen |
| 6,246,778 B1 | 6/2001 | Moore |
| 6,744,367 B1 | 6/2004 | Forster |
| 6,771,256 B1 | 8/2004 | Abraham et al. |
| 6,786,626 B2 | 9/2004 | Wu |
| 6,838,989 B1 | 1/2005 | Mays et al. |
| 6,839,035 B1 | 1/2005 | Addonisio et al. |
| 6,851,999 B2 | 2/2005 | Fong |
| 6,965,205 B2 | 11/2005 | Piepgras et al. |
| 7,012,544 B2 | 3/2006 | Cunningham et al. |
| 7,046,160 B2 | 5/2006 | Pederson et al. |
| 7,064,498 B2 | 6/2006 | Dowling et al. |
| 7,084,769 B2 | 8/2006 | Bauer et al. |
| 7,086,587 B2 | 8/2006 | Myllymaki |
| 7,086,769 B1 | 8/2006 | Thompson et al. |
| 7,098,794 B2 | 8/2006 | Lindsay |
| 7,109,986 B2 | 9/2006 | Kerr et al. |
| 7,167,106 B2 | 1/2007 | Haase |
| 7,202,838 B2 | 4/2007 | Kerr et al. |
| 7,304,577 B2 | 12/2007 | Waldner |
| 7,375,650 B2 | 5/2008 | Lo |
| 7,377,421 B2 | 5/2008 | Rhoads |
| 7,378,973 B2 | 5/2008 | Dixon |
| 7,477,152 B2 | 1/2009 | Forster |
| 7,490,054 B2 * | 2/2009 | Reade et al. .......... 705/16 |
| 7,492,346 B2 | 2/2009 | Manabe |
| 7,495,576 B2 | 2/2009 | Maskeny et al. |
| 7,515,149 B2 | 4/2009 | Kerr et al. |
| 7,564,426 B2 | 7/2009 | Poor |
| 7,600,906 B2 | 10/2009 | Chon |
| 7,654,723 B2 | 2/2010 | Chang |
| 7,670,020 B2 | 3/2010 | Chang |
| 7,695,165 B2 | 4/2010 | Chang |
| 7,722,172 B2 | 5/2010 | Silverbrook |
| 7,722,241 B2 | 5/2010 | Chang |
| 7,737,858 B2 | 6/2010 | Matityaho |
| 7,750,810 B2 | 7/2010 | Ritter et al. |
| 7,752,790 B1 | 7/2010 | Michael et al. |
| 7,756,467 B2 | 7/2010 | Bent et al. |
| 7,810,983 B2 | 10/2010 | Chang |
| 7,817,045 B2 | 10/2010 | Onderko |
| 7,845,823 B2 | 12/2010 | Mueller |
| 7,850,341 B2 | 12/2010 | Mrakovich |
| 7,868,778 B2 | 1/2011 | Kenwright |
| 7,876,101 B2 | 1/2011 | Lee |
| 7,903,103 B2 | 3/2011 | Osterberg et al. |
| 7,920,050 B2 | 4/2011 | Juels et al. |
| 7,959,326 B2 | 6/2011 | Laporte |
| 7,961,097 B2 | 6/2011 | Porte et al. |
| 7,979,026 B2 | 7/2011 | Hulvey |
| 8,014,722 B2 | 9/2011 | Abel |
| 8,018,345 B2 | 9/2011 | Xiang et al. |
| 8,068,011 B1 | 11/2011 | Sajadi et al. |
| 8,102,797 B2 | 1/2012 | Abel |
| 8,112,066 B2 | 2/2012 | Ayed |
| 8,117,445 B2 | 2/2012 | Werner |
| 8,126,505 B2 | 2/2012 | Tulloch |
| 8,237,562 B1 | 8/2012 | Picasso et al. |
| 8,242,893 B1 | 8/2012 | Lin |
| 8,249,935 B1 | 8/2012 | DiMartino et al. |
| 8,321,922 B1 | 11/2012 | Lo et al. |
| 8,326,991 B2 | 12/2012 | Diaz et al. |
| 8,332,272 B2 | 12/2012 | Fisher |
| 8,469,269 B2 | 6/2013 | Daily et al. |
| 8,474,700 B1 | 7/2013 | Lewis et al. |
| 8,520,695 B1 | 8/2013 | Rubin et al. |
| 8,638,228 B2 | 1/2014 | Amigo et al. |
| 8,655,286 B2 | 2/2014 | Mendolia |
| 8,750,514 B2 | 6/2014 | Gallo et al. |
| 8,842,102 B2 | 9/2014 | Forster et al. |
| 8,880,055 B1 | 11/2014 | Clement et al. |
| 8,937,531 B2 | 1/2015 | Rimai et al. |
| 8,961,306 B2 | 2/2015 | LeMay et al. |
| 9,024,763 B2 | 5/2015 | Hamedani |
| 9,108,434 B2 | 8/2015 | Tsirline et al. |
| 9,124,442 B2 | 9/2015 | McCormack et al. |
| 9,698,872 B2 | 7/2017 | Haverinen et al. |
| 9,767,329 B2 | 9/2017 | Forster |
| 9,894,468 B2 | 2/2018 | Brown et al. |
| 10,402,598 B2 | 9/2019 | Forster |
| 10,540,527 B2 | 1/2020 | Forster |
| 2002/0030992 A1 | 3/2002 | Lefebvre |
| 2002/0036622 A1 | 3/2002 | Jaeger |
| 2002/0154633 A1 * | 10/2002 | Shin .......... H04L 47/10 370/389 |
| 2002/0159246 A1 * | 10/2002 | Murasko et al. .......... 362/84 |
| 2002/0186133 A1 | 12/2002 | Loof |
| 2002/0190845 A1 | 12/2002 | Moore |
| 2003/0029918 A1 | 2/2003 | Leanheart et al. |
| 2003/0034985 A1 | 2/2003 | Needham Riddle |
| 2003/0115096 A1 * | 6/2003 | Reynolds .......... G06Q 30/02 705/14.58 |
| 2004/0012486 A1 | 1/2004 | Mani |
| 2004/0183742 A1 | 9/2004 | Goff et al. |
| 2004/0220860 A1 | 11/2004 | Persky et al. |
| 2005/0017071 A1 | 1/2005 | Noonan |
| 2005/0186902 A1 | 8/2005 | Lieffort et al. |
| 2005/0207823 A1 | 9/2005 | Adams et al. |
| 2005/0280631 A1 * | 12/2005 | Wong et al. .......... 345/158 |
| 2006/0028822 A1 | 2/2006 | Tanamachi |
| 2006/0032926 A1 | 2/2006 | Baba et al. |
| 2006/0066453 A1 | 3/2006 | Homanfar et al. |
| 2006/0071778 A1 | 4/2006 | Vesikivi et al. |
| 2006/0080819 A1 | 4/2006 | McAllister |
| 2006/0090384 A1 | 5/2006 | Woodruff |
| 2006/0160488 A1 | 7/2006 | Sueoka et al. |
| 2006/0214794 A1 | 9/2006 | Wang |
| 2006/0215958 A1 | 9/2006 | Yeo |
| 2006/0230276 A1 | 10/2006 | Nochta |
| 2006/0261938 A1 | 11/2006 | Lai |
| 2006/0261950 A1 | 11/2006 | Arneson et al. |
| 2006/0266824 A1 * | 11/2006 | Hassenbuerger .... G07G 1/0054 235/383 |
| 2006/0273176 A1 | 12/2006 | Audebert et al. |
| 2006/0287964 A1 | 12/2006 | Brown |
| 2006/0290501 A1 | 12/2006 | Hammad et al. |
| 2006/0293956 A1 * | 12/2006 | Walker et al. .......... 705/14 |
| 2007/0008140 A1 | 1/2007 | Saarisalo et al. |
| 2007/0013479 A1 | 1/2007 | Goel et al. |
| 2007/0022294 A1 | 1/2007 | Lapstun et al. |
| 2007/0029384 A1 | 2/2007 | Atherton |
| 2007/0029939 A1 | 2/2007 | Burkum et al. |
| 2007/0056871 A1 | 3/2007 | Griffiths |
| 2007/0057791 A1 | 3/2007 | Karjoth et al. |
| 2007/0075145 A1 | 4/2007 | Arendonk |
| 2007/0090954 A1 | 4/2007 | Mahaffey |
| 2007/0120772 A1 | 5/2007 | Kim et al. |
| 2007/0135112 A1 | 6/2007 | Lessing |
| 2007/0145152 A1 * | 6/2007 | Jogand-Coulomb et al. .......... 235/492 |
| 2007/0188483 A1 | 8/2007 | Bonner |
| 2007/0194879 A1 | 8/2007 | Backes et al. |
| 2007/0215685 A1 | 9/2007 | Self |
| 2007/0229250 A1 | 10/2007 | Recker |
| 2007/0273951 A1 * | 11/2007 | Ribi .......... B42D 15/022 359/237 |
| 2007/0274242 A1 | 11/2007 | Lamacraft et al. |
| 2008/0022160 A1 | 1/2008 | Chakraborty |
| 2008/0040845 A1 | 2/2008 | Shoshan |
| 2008/0064346 A1 | 3/2008 | Charrat |
| 2008/0079582 A1 | 4/2008 | Alexis et al. |
| 2008/0094854 A1 | 4/2008 | Coleman |
| 2008/0100443 A1 | 5/2008 | Grunwald et al. |
| 2008/0101400 A1 | 5/2008 | Auterinen |
| 2008/0117047 A1 | 5/2008 | Collins et al. |
| 2008/0132167 A1 | 6/2008 | Bent et al. |
| 2008/0136647 A1 | 6/2008 | Brown |
| 2008/0146148 A1 | 6/2008 | Hulvey |
| 2008/0150719 A1 | 6/2008 | Cote et al. |

(56) References Cited

U.S. PATENT DOCUMENTS

| | | |
|---|---|---|
| 2008/0162154 A1 | 7/2008 | Fein et al. |
| 2008/0167000 A1 | 7/2008 | Wentker et al. |
| 2008/0183581 A1 | 7/2008 | Coppolani |
| 2008/0191878 A1 | 8/2008 | Abraham |
| 2008/0192932 A1 | 8/2008 | Graeber et al. |
| 2008/0219227 A1 | 9/2008 | Michaelis |
| 2008/0238610 A1 | 10/2008 | Rosenberg |
| 2008/0238706 A1 | 10/2008 | Kenwright |
| 2008/0248815 A1 | 10/2008 | Busch |
| 2008/0251582 A1 | 10/2008 | Nguyen |
| 2008/0255960 A1 | 10/2008 | Nguyen |
| 2008/0258875 A1 | 10/2008 | Jesme et al. |
| 2008/0262928 A1* | 10/2008 | Michaelis ............... G06Q 30/02 705/14.26 |
| 2008/0276507 A1* | 11/2008 | Hines ..................... G09F 13/14 40/541 |
| 2008/0300985 A1* | 12/2008 | Shamp et al. ................... 705/14 |
| 2008/0309463 A1 | 12/2008 | Godzwon et al. |
| 2009/0081943 A1 | 3/2009 | Dobyns et al. |
| 2009/0085746 A1 | 4/2009 | Erickson et al. |
| 2009/0088077 A1 | 4/2009 | Brown et al. |
| 2009/0088229 A1 | 4/2009 | Hammad et al. |
| 2009/0102748 A1 | 4/2009 | Stoyer et al. |
| 2009/0115614 A1 | 5/2009 | Bertin |
| 2009/0118006 A1 | 5/2009 | Kelly et al. |
| 2009/0146814 A1 | 6/2009 | Hammad et al. |
| 2009/0168441 A1 | 7/2009 | Lin |
| 2009/0174556 A1 | 7/2009 | Horne et al. |
| 2009/0189816 A1 | 7/2009 | Nikiti |
| 2009/0192937 A1 | 7/2009 | Griffin et al. |
| 2009/0193500 A1 | 7/2009 | Griffin |
| 2009/0197551 A1 | 8/2009 | Paraskake |
| 2009/0212919 A1* | 8/2009 | Selgrath ............... G06K 19/041 340/10.1 |
| 2009/0221240 A1 | 9/2009 | Zhang |
| 2009/0257242 A1 | 10/2009 | Wendman |
| 2009/0258678 A1 | 10/2009 | Chava et al. |
| 2009/0267862 A1 | 10/2009 | Roesner et al. |
| 2009/0282859 A1 | 11/2009 | Glielmo et al. |
| 2009/0292816 A1 | 11/2009 | Etchegoyen |
| 2009/0297157 A1 | 12/2009 | Nakagawa |
| 2009/0315670 A1 | 12/2009 | Naressi |
| 2010/0009627 A1 | 1/2010 | Huomo |
| 2010/0012715 A1 | 1/2010 | Williams et al. |
| 2010/0026464 A1 | 2/2010 | Graeber |
| 2010/0030636 A1 | 2/2010 | Vijayshankar et al. |
| 2010/0046198 A1 | 2/2010 | Hoffman |
| 2010/0066508 A1 | 3/2010 | Jokinen et al. |
| 2010/0066561 A1 | 3/2010 | Ulrich et al. |
| 2010/0075666 A1 | 3/2010 | Garner |
| 2010/0079416 A1 | 4/2010 | Chung et al. |
| 2010/0082444 A1 | 4/2010 | Lin et al. |
| 2010/0082485 A1 | 4/2010 | Lin |
| 2010/0085774 A1 | 4/2010 | Peifer |
| 2010/0107463 A1 | 5/2010 | Spiro |
| 2010/0123553 A1 | 5/2010 | Banerjee et al. |
| 2010/0141452 A1 | 6/2010 | Lian et al. |
| 2010/0148964 A1 | 6/2010 | Broer |
| 2010/0148965 A1 | 6/2010 | Alexis et al. |
| 2010/0161410 A1 | 6/2010 | Tulloch |
| 2010/0161434 A1 | 6/2010 | Herwig et al. |
| 2010/0172149 A1 | 7/2010 | Siemiet |
| 2010/0174599 A1 | 7/2010 | Rosenblatt et al. |
| 2010/0176971 A1 | 7/2010 | Banerjee et al. |
| 2010/0188842 A1 | 7/2010 | Yohananoff |
| 2010/0211431 A1* | 8/2010 | Lutnick et al. ................. 705/10 |
| 2010/0216396 A1 | 8/2010 | Fernandez et al. |
| 2010/0217709 A1 | 8/2010 | Aabye |
| 2010/0221999 A1 | 9/2010 | Braun et al. |
| 2010/0231362 A1 | 9/2010 | Smith et al. |
| 2010/0241494 A1 | 9/2010 | Kumar et al. |
| 2010/0255865 A1 | 10/2010 | Karmarkar et al. |
| 2010/0262449 A1* | 10/2010 | Monteforte et al. ............... 705/8 |
| 2010/0265041 A1 | 10/2010 | Almog et al. |
| 2010/0269383 A1* | 10/2010 | Nifenecker ..................... 40/541 |
| 2010/0271839 A1 | 10/2010 | Chan |
| 2010/0274859 A1 | 10/2010 | Bucuk |
| 2010/0275265 A1 | 10/2010 | Fiske |
| 2010/0282849 A1 | 11/2010 | Mair |
| 2010/0290251 A1 | 11/2010 | Wang |
| 2010/0294835 A1 | 11/2010 | Bam et al. |
| 2010/0303230 A1 | 12/2010 | Taveau |
| 2010/0306076 A1 | 12/2010 | Taveau |
| 2010/0306819 A1 | 12/2010 | Nahari |
| 2010/0311326 A1 | 12/2010 | Klabunde et al. |
| 2011/0000971 A1 | 1/2011 | Onderko |
| 2011/0029777 A1 | 2/2011 | Murakami et al. |
| 2011/0047463 A1 | 2/2011 | Shepherd et al. |
| 2011/0047759 A1* | 3/2011 | Reiter ................ A44B 17/0023 24/303 |
| 2011/0065383 A1 | 3/2011 | Frankland et al. |
| 2011/0084814 A1 | 4/2011 | Ramsch |
| 2011/0112918 A1 | 5/2011 | Mestre |
| 2011/0112920 A1 | 5/2011 | Mestre |
| 2011/0114735 A1 | 5/2011 | Ziai et al. |
| 2011/0149079 A1 | 6/2011 | Anderson |
| 2011/0149596 A1 | 6/2011 | Lv |
| 2011/0156640 A1 | 6/2011 | Moshfeghi |
| 2011/0165859 A1 | 7/2011 | Wengrovitz |
| 2011/0185607 A1 | 8/2011 | Forster et al. |
| 2011/0187558 A1 | 8/2011 | Serex |
| 2011/0191478 A1 | 8/2011 | Eischeid et al. |
| 2011/0195748 A1 | 8/2011 | Main et al. |
| 2011/0211344 A1 | 9/2011 | Harbers |
| 2011/0225421 A1 | 9/2011 | Han et al. |
| 2011/0227487 A1 | 9/2011 | Nichol |
| 2011/0227507 A1 | 9/2011 | Salm |
| 2011/0228517 A1 | 9/2011 | Kawabat |
| 2011/0234379 A1 | 9/2011 | Lee |
| 2011/0235318 A1 | 9/2011 | Simon |
| 2011/0238995 A1 | 9/2011 | Blanco |
| 2011/0121488 A1 | 10/2011 | Sikkens |
| 2011/0244799 A1 | 10/2011 | Roberts et al. |
| 2011/0258443 A1 | 10/2011 | Barry |
| 2011/0276961 A1 | 11/2011 | Johansson et al. |
| 2011/0285511 A1 | 11/2011 | Maguire et al. |
| 2011/0287718 A1 | 11/2011 | Abel |
| 2011/0295108 A1 | 12/2011 | Cox |
| 2011/0307309 A1 | 12/2011 | Forster |
| 2011/0320291 A1 | 12/2011 | Coon |
| 2011/0320314 A1 | 12/2011 | Brown |
| 2011/0320345 A1 | 12/2011 | Taveau |
| 2012/0001725 A1 | 1/2012 | Chen |
| 2012/0011572 A1 | 1/2012 | Chew et al. |
| 2012/0013448 A1 | 1/2012 | Baranowski |
| 2012/0024951 A1 | 2/2012 | Graeber |
| 2012/0029990 A1 | 2/2012 | Fisher |
| 2012/0032632 A1 | 2/2012 | Soar |
| 2012/0039472 A1 | 2/2012 | Lic |
| 2012/0055998 A1 | 3/2012 | Mieslinger |
| 2012/0059741 A1 | 3/2012 | Khan et al. |
| 2012/0061465 A1 | 3/2012 | Luo |
| 2012/0072979 A1 | 3/2012 | Cha |
| 2012/0075148 A1 | 3/2012 | Cho |
| 2012/0089845 A1 | 4/2012 | Raleigh |
| 2012/0126700 A1 | 5/2012 | Mayfield et al. |
| 2012/0135839 A1 | 5/2012 | Watanabe et al. |
| 2012/0154633 A1* | 6/2012 | Rodriguez ............... 348/231.99 |
| 2012/0156992 A1 | 6/2012 | Walker et al. |
| 2012/0083205 A1 | 7/2012 | Marcu et al. |
| 2012/0218084 A1 | 8/2012 | Arponen et al. |
| 2012/0253646 A1 | 10/2012 | Reghunath |
| 2012/0253974 A1 | 10/2012 | Haikonen et al. |
| 2012/0256494 A1 | 10/2012 | Kesler et al. |
| 2012/0265596 A1 | 10/2012 | Mazed et al. |
| 2012/0265682 A1 | 10/2012 | Menon |
| 2012/0278676 A1 | 11/2012 | Teraura |
| 2012/0297204 A1 | 11/2012 | Buer |
| 2012/0309302 A1 | 12/2012 | Buhot |
| 2012/0315839 A1 | 12/2012 | Mumcuoglu et al. |
| 2013/0006847 A1 | 1/2013 | Hammad et al. |
| 2013/0045679 A1 | 2/2013 | Orsatti et al. |
| 2013/0063008 A1 | 3/2013 | Martin |
| 2013/0065523 A1 | 3/2013 | Yun et al. |

(56) References Cited

U.S. PATENT DOCUMENTS

| | | |
|---|---|---|
| 2013/0106576 A1 | 5/2013 | Hinman |
| 2013/0157713 A1 | 6/2013 | Stolarczyk |
| 2013/0165041 A1 | 6/2013 | Bukovjan et al. |
| 2013/0173455 A1 | 7/2013 | Adams et al. |
| 2013/0176184 A1 | 7/2013 | Dokai et al. |
| 2013/0309965 A1 | 11/2013 | Hillan |
| 2013/0342323 A1 | 12/2013 | Hinman et al. |
| 2013/0344805 A1 | 12/2013 | Lefley |
| 2014/0009268 A1 | 1/2014 | Oshima et al. |
| 2014/0070850 A1 | 3/2014 | Darwhekar et al. |
| 2014/0113551 A1 | 4/2014 | Krishnan et al. |
| 2014/0139347 A1 | 5/2014 | Forster |
| 2014/0145823 A1 | 5/2014 | Aase |
| 2014/0152856 A1 | 6/2014 | Ikeda et al. |
| 2014/0227970 A1 | 8/2014 | Brockenbrough et al. |
| 2014/0229251 A1 | 8/2014 | Lim et al. |
| 2014/0252083 A1 | 9/2014 | Lee et al. |
| 2014/0370803 A1 | 12/2014 | Haverinen et al. |
| 2015/0140929 A1 | 5/2015 | Lefley |
| 2015/0334521 A1 | 11/2015 | Lee |
| 2016/0283759 A1 | 9/2016 | Forster |
| 2017/0012355 A1 | 1/2017 | Pachler et al. |
| 2017/0302335 A1 | 10/2017 | Sawata et al. |
| 2017/0344765 A1 | 11/2017 | Forster |
| 2018/0049029 A1 | 2/2018 | Kumar et al. |
| 2019/0384948 A1 | 12/2019 | Forster |
| 2020/0151402 A1 | 5/2020 | Forster |

FOREIGN PATENT DOCUMENTS

| | | | | |
|---|---|---|---|---|
| CN | 101233753 | | 7/2008 | |
| CN | 101253750 | | 8/2008 | |
| CN | 201302803 | Y | 9/2009 | |
| CN | 102217410 | | 10/2011 | |
| CN | 102638446 | | 8/2012 | |
| EP | 0677887 | | 10/1995 | |
| EP | 112746961 | | 7/2003 | |
| EP | 1912437 | | 4/2008 | |
| EP | 1914631 | | 4/2008 | |
| EP | 2143991 | | 9/2009 | |
| EP | 1948995 | | 1/2010 | |
| EP | 2174457 | | 4/2010 | |
| EP | 1792272 | B1 | 10/2010 | |
| EP | 2237519 | | 10/2010 | |
| EP | 2296025 | | 3/2011 | |
| EP | 2309431 | A1 | 4/2011 | |
| EP | 2366937 | | 9/2011 | |
| EP | 2371110 | | 10/2011 | |
| FR | 2783960 | | 3/2000 | |
| JP | 2002-162918 | | 6/2002 | |
| JP | 2006011422 | | 1/2006 | |
| JP | 2006-030882 | | 2/2006 | |
| JP | 2006-30883 | | 2/2006 | |
| JP | 2006058435 | | 3/2006 | |
| JP | 2006349887 | | 12/2006 | |
| JP | 2007034362 | | 2/2007 | |
| JP | 20070343362 | * | 2/2007 | |
| JP | 2007-114924 | | 5/2007 | |
| JP | 2007114924 | A * | 5/2007 | |
| JP | 02002162918 | * | 6/2007 | |
| KR | 20100072115 | | 6/2010 | |
| WO | 2006031824 | | 3/2006 | |
| WO | 2006095212 | | 9/2006 | |
| WO | 2006098765 | | 9/2006 | |
| WO | 2006111782 | | 10/2006 | |
| WO | WO-2006111797 | A1 * | 10/2006 | ........... G09G 3/3406 |
| WO | 2007002459 | | 1/2007 | |
| WO | 2007035835 | | 3/2007 | |
| WO | 2007064069 | | 6/2007 | |
| WO | 2008034937 | | 3/2008 | |
| WO | 2008063706 | | 5/2008 | |
| WO | 2008087431 | | 7/2008 | |
| WO | 2008132269 | | 11/2008 | |
| WO | 2008142455 | | 11/2008 | |
| WO | 2009028203 | | 3/2009 | |
| WO | 2010077194 | | 7/2010 | |
| WO | 2010095988 | | 8/2010 | |
| WO | 2010148816 | | 12/2010 | |
| WO | 2011010970 | | 1/2011 | |
| WO | 2011020041 | | 2/2011 | |
| WO | 2011033424 | | 3/2011 | |
| WO | 2011053914 | | 5/2011 | |
| WO | 2011088190 | | 7/2011 | |
| WO | 2011094384 | | 8/2011 | |
| WO | 2011109092 | | 9/2011 | |
| WO | 2011112778 | | 9/2011 | |
| WO | 2011121488 | | 10/2011 | |
| WO | WO2012037255 | | 3/2012 | |

OTHER PUBLICATIONS

Alois Ferscha, Orientation sensing for gesture-based interaction with smart artifacts, 2005 (Year: 2005).*

Australia: Examination Report dated Jun. 13, 2017; Application No. 2016202079; 3 pages.

"AN1445: Antenna design guide for MFRC52x, PN51x and PN53x, Rev.1.2, Document AN1445_12", NXP B.V., (Oct. 11, 2010), 65 pgs.

"NFC Record Type Definition (RTD)", Technical Specification NFC Forum, RTD 1.0, NFCForum-TS-RTD_1 .0, (Jul. 24, 2006), 20 pgs.

"Radio Frequency Identification (RFID): A Focus on Information Security and Privacy", OECD Digital Economy Papers, No. 138, Jan. 14, 2008, 11-81.

"Radio-Frequency-IDentific@tion, http://rfid-handbook.com/", advertisement (Dec. 2, 2011), 5 pgs.

"South Korea Telecommunications Report Included BMI's Forecasts", Q2 2012, Business Monitor International Ltd., (Apr. 2012), 94 pgs.

A Near Field Communication Tool for Building Intelligent Environment using Smart Posters, International Journal of Computers and Communications, Issue 1, vol. 4, 2010, Pilar Castro Garrido, Guillermo Matas Miraz, Irene Luque Ruiz, and Miguel Angel Gomez-Nieto.

A Pervasive Presentator—Simplifying the Task of Presenting, Lulea University of Technology; Viktor Lindgren, Mattias Lundberg, Elias Naslund, John Viklund (2012).

A System of Secure Virtual Coupons Using NFC Technology, IEEE Computer Society, CompProceedings of the Fifth Annual IEEE International Conference on Pervasive Computing and Communications Workshops 2007 (PerComW'07); Manfred Aigner, Sandra Dominikus, Martin Feldhofer.

Amato-McCoy, Deena M. Crime stoppers: by focusing their loss prevention efforts on the entire enterprise, grocers are in a better position to combat internal and external theft. Grocery Headquarters, v77, No. 11, p. 101 (3). Nov. 2011.

Anonymous, "Near-field communications will be standard technology for mobiles", Electronics Weekly, (Feb. 21, 2007), p. 8.

Antoniou, Zoe, "NFC-Based Mobile Middleware for Intuitive User Interaction With Security in Smart Homes", Proc. Of the 5th IASTED International Conference on Communication Systems and Networks (CSN'06), Aug. 28-30, 2006, Palma De Mallorca, Spain, Track 543-038, 6 pgs.

Application of Near Field Communication for Health Monitoring in Daily Life; Esko Strommer, Jouni Kaartenen, Juha Parkka, Arto Ylisauko-oja, Ilkka Korhonen; Proceedings of the 28th IEEE EMBS Annual International Conference New York City, USA, Aug. 30-Sep. 3, 2006.

Bauer-Reich,C., et al. "Low-profile, high-permeability antennaless RFID tags for use on metal objects", Proceedings of the 2012 IEEE International Workshop on Antenna Technology (iWAT), (Mar. 5-7, 2012), 32-35.

Becher, Michael et al., "Mobile Security Catching Up? Revealing the Nuts and Bolts of the Security of Mobile Devices", 2011 IEEE Symposium on Security and Privacy, 96-11.

Bling: NFC Arrives in U.S., Sam Churchill, Oct. 27, 2010, http://www.dailywireless.org/2010/10/27/bling-nfc-arrives-in-u-s/.

(56) References Cited

OTHER PUBLICATIONS

Bovelli, S., "A Novel Antenna Design for Passive RFID Transponders on Metal Surfaces", Proceedings of the 36th European Microwave Conference, Manchester, UK (Sep. 2006), 580-582.
Broll, Gregor, et al., "Touch to Play-Exploring Touch-Based Mobile Interaction with Public Displays", 3rd International Workshop on Near Field Communication, Feb. 22, 2011, 15-20.
Cavoukian, A., "Mobile Near Field Communications (NFC)—"Tap'n. Go"—Keep it Secure & Private", Information and Privacy Commissioner, Ontario, Canada/Privacy by Design (Nov., 2011), 22 pgs.
Chai, Qi, "Design and Analysis of Security Schemes for Low-cost RFID Systems", Doctor of Philosophy Thesis in Electrical and Computer Engineering, University of Waterloo, Ontario, Canada, 2012, 184 pgs.
Cheng, Hsu-Chen, et al., "A Secure and Practical Key Management Mechanism for NFC Read-Write Mode", J. Computational Information Systems, 7:11, (2011), 3819-3828.
Cheng, Jerry, et al., "SmartSiren: Virus Detection and Alert for Smartphones", MobiSys'07, Jun. 11-4, 2007, San Juan, Puerto Rico, 258-271.
Choi, Kwanghoon, et al., "A Secure Application Invocation Mechanism in Mobile Phones for Near Field Communication", 2012 IEEE International Conference on Consumer Electronics (ICCE), Jan. 2012, 731-732.
Christian Metzger et al: "Making Radio Frequency Indentificaiton Visible—A Watchdog Tag", Fifth Annual IEEE International Conference on pervasive computing and communications workshops, Mar. 19-23, 2007.
Christianson, B., et al. (eds.), "Security Protocols", 13th International Workshop, Revised Selected Papers, Cambridge, UK, (Apr. 20-22, 2005), Lecture Notes in Computer Science, 4631, Springer-Verlag, Berlin, 354 pgs.
Close Contact: An Examination of the Future of Near Field Communications, International Journal of Management & Information Systems—First Quarter 2012 vol. 16, No. 1; Chris Rose Capella.
Cole, P.H., et al., Networked RFID Systems and Lightweight Cryptography: Raising Barriers to Product Counterfeiting, First Edition, Springer-Verlag, Berlin (2003), 350 pgs.
Connecting the Mobile Phone with the Internet of Things—Benefits of EPC and NFC Compatibility; Thomas J.P. Wiechert, Florian Michahelles, 2007.
Coppolino, Luigi, et al., "A Trusted information Agent for Security Information and Event Management", ICONS 2012: The Seventh International Conference on Systems, 6-12.
Do you talk to each poster? Security and Privacy for Interactions with Web Service by means of Contact Free Tag Readings, Peter Schoo, Massimo Paolucci, Feb. 24 2009 First International Workshop on Near Field Communication.
Dodson, B., et al., "Micro-Interactions with NFC-Enabled Mobile Phones", Proceedings of the Third International Conference on Mobile Computing, Applications, and Services (MobiCASE), Los Angeles, CA, Oct. 2011. Retrieved from the Internet: <URL: http://mobisocial.stanford.edu/papers/mobicase11.pdf>, 20 pgs.
Elliptic Curve Certificates and Signatures for NFC Signature Records, Reasearch In Motion, Certicom Research, Jan. 1, 2011, Tony Rosati, Greg Zaverucha.
Enabling RFID in Retail, George Roussos, Birkbeck, University of London, IEEE Computer Society, Mar. 2006.
Encrypted NFC emergency tags based on the German Telematics Infrastructure, 2011 Third International Workshop on Near Field Communication, Sebastian Dunnebeil, Felix Kobler, Philip Koene, Helmut Kremar, Jan Marco Leimeister.
Enhancing Authentication in eBanking with NFC enabled mobile phones, Aug. 11, 2008, Diego Alejandro Ortiz-Yepes.
Enhancing Security and Usability Features of NFC, 2009; Beygo, Omer Kerem; Eraslan, Cihan.
European Search Report dated Nov. 25, 2016 for European Application No. EP16002075 filed Sep. 26, 2016.

Finkenzeller, K., "Known attacks on RFID systems, possible countermeasures and upcoming standardization activities", presentation slides, RFID-Systech, Bremen, Germany, Jun. 2009. Retrieved from the Internet: <URL: http://rfidhandbook.de/downloads/Finkenzeller Systech-Bremen-2009 v1.0.pdf>, 31 pgs.
Francis, Lishoy, et al., "Practical NFC Peer-to-Peer Relay Attack Using Mobile Phones", The 6th Workshop on RFID Security (RFIDSec 2010), Istanbul, Turkey (LNCS), Jun. 7-9, 2010, 35 49.
Francis, Lishoy, et al., "Practical Relay Attack on Contactless Transactions by Using NFC Mobile Phones", in Cryptology ePrint Archive, Report 2011/618, Nov. 2011, 16 pgs.
Gebhart, M, et al., "Design of 13.56 MHz Smartcard Stickers with Ferrite for Payment and Authentication", Proceedings of the 2011 3rd International Workshop on Near Field Communication (NFC), Feb. 21-22, 2011. Retrieved from the Internet: <URL: https://online.tugraz.at/tug_online/voe_main2.getVollText?pDocumentNr=202812&pCurrP k=59398>, 6 pgs.
Ghanname, Taoufik. How NFC can to speed Bluetooth transactions-today. Eetimes. Feb. 14, 2006. Retrieved at http://eetimes.com/General/PrintView/4012606.
Hancke, G.P., "Practical Eavesdropping and Skimming Attacks on High-Frequency RFID Tokens", Preprint version of article published in Journal of Computer Security. vol. 19, Issue 2. (Jun. 2010). Retrieved from the Internet: <URL: http://www.rfidblog.org.uk/Hancke-JoCSSpecialRFIDJune2010.pdf>, 23 pgs.
Hancke, G.P., "Security of proximity identification systems", Technical Report, No. 752, University of Cambridge Computer Laboratory, UK (Jul. 2009), 161 pgs.
Hancke, G.P., et al., "Security Challenges for User-Orented RFID Applications within the 'Internet of Things'", J. Internet Technology, vol. 11, No. 3, 2010, 307-313.
Hardy, Robert, et al., "Touch & Interact: Touch-based Interaction of Mobile Phones with Displays", MobileHCL 2008, Proc. 10th international conference on Human computer interaction with mobile devices and services, 245-254.
Haselsteiner, Ernst, et al., "Security in Near Field Communication (NFC): Strengths and Weaknesses", Proceedings of the Workshop on RFID Security (RFIDSec), Graz, Austria, Jul. 12-14, 2006, 11 pgs.
Hend S. Al-Khalifa: "Utilizing QR Code and Mobile Phones for Blinds and Visually Impaired People", copyright 2008.
Hinske, S., et al., "RFIDice—Augmenting Tabletop Dice with RFID", Journal of Virtual Reality and Broadcasting, vol. 5, No. 4, (2008), 12 pgs.
Husni, Emir, et al., "Efficient Tag-to-Tag Near Field Communication (NFC) Protocol for Secure Mobile Payment", 2nd International Conference on Instrumentation, Communications, Information Technology, and Biomedical Engineering (ICIC-BME), Bandung, Indonesia, Nov. 8-9, 2011, 97-101.
International Preliminary Report on Patentability and Written Opinion dated Apr. 21, 2015 for International Application PCT/US13/031448 filed Mar. 14, 2013.
International Preliminary Report on Patentability and Written Opinion dated Jul. 31, 2012 for International Application PCT/US11/022680 filed Jan. 27, 2011.
International Preliminary Report on Patentability and Written Opinion dated Jul. 31, 2012 for International Application PCT/US11/022687 filed Jan. 27, 2011.
International Preliminary Report on Patentability and Written Opinion dated Mar. 04, 2014 for International Application PCT/US12/053322 filed Aug. 31, 2012.
International Preliminary Report on Patentability and Written Opinion dated Mar. 10, 2015 for International Application PCT/US12/031136 filed Mar. 14, 2013.
International Preliminary Report on Patentability and Written Opinion dated May 19, 2015 for International Application PCT/US12/031131 filed Mar. 14, 2013.
International Search Report dated Aug. 20, 2013 for International Application PCT/US13/031131 filed Mar. 14, 2013.
International Search Report dated Aug. 6, 2013 for International Application PCT/US13/031448 filed Mar. 14, 2013.
International Search Report dated Mar. 11, 2011 for International Application PCT/US11/022687 filed Jan. 27, 2011.

(56) References Cited

OTHER PUBLICATIONS

International Search Report dated Mar. 8, 2011 for International Application PCT/US11/022680 filed Jan. 27, 2011.

International Search Report dated May 22, 2013 for International Application PCT/US12/031136 filed Mar. 14, 2013.

International Search Report and Written Opinion dated Mar. 4, 2014 for International Application PCT/US12/053322 filed Aug. 31, 2012.

Johnansson, B., "An Introduction to RFID—Information Security and Privacy Concerns", TDDC03 Projects, (Spring 2004), 14 pgs.

Juels, A., et al., "The Blocker Tag: Selective Blocking of RFID Tags for Consumer Privacy", Proceedings of ACC CCS'03, Washington, DC (Oct. 27-30, 2003), 9 pgs.

Jung, M, et al., "All-Printed and Roll-to-Roll Printable 13.56-MHz-Operated 1-bit Rf Tag on Plastic Foils", IEEE Transactions on Electron Devices, (Feb. 19, 2010), 10 pgs.

Kazmi, Hammad Raza, "Security and Privacy Issues in Near Field Communication (NFC) Systems", Master Thesis, Royal Institute of Technology, Sweden, Apr. 2011, 59 pgs.

Kfir, Ziv, et al., "Picking Virtual Pockets using Relay Attacks on Contactless Smartcard Systems", Proceeding of the First International Conference on Security and Privacy for Emerging Areas in Communications Networks, Sep. 5-9, 2005, 47-58.

Kortvedt, H.S., "Securing Near Field Communication", Thesis for Master of Science in Communication Technology, Norwegian University of Science and Technology, (Jun. 2009), 135 pgs.

Kuo, S., "A performance evaluation method for EMI sheet of metal mountable HR RFID tag", Measurement, 44 (2011), 946-953.

Kupusamy, K. S. et al., "A Model for Remote Access and Protection of Smartphones Using Short Message Service", International. Computer Science, Engineering and. Information Technology (IJCSEIT), vol. 2, No. 1, (Feb. 2012), 91-100.

LocaTag-An NFC-based system enhancing instant messaging tools with real-time user location; Kobler, Philip Koene, Helmut Kremar, Matthias Altmann, Jan Marco Leimeister, Apr. 20, 2010 Second International Workshop on Near Field Communication.

Location-Triggered Code Execution-Dismissing Displays and Keypads for Mobile Interaction; W. Narzt and H. Schmitzberger, C. Stephanidis (Ed.): Universal Access in HCI, Part II, HCII 2009, LNCS 5615, pp. 374-383, 2009. © Springer-Verlag Berlin Heidelberg 2009.

Long, Men, et al., "Human Perceivable Authentication: An Economical Solution for Security Associations in Short-Distance Wireless Networking", Proceedings of 16th International Conference on Computer Communications and Networks, Aug. 13-16, 2007, 257-264.

Madlmayr, Gerald, etal., "NFC Devices: Security & Privacy", Proceedings of the 3rd International Conference on Availability, Reliability and Security, Barcelona, Spain, Mar. 7, 2008, 13 pgs.

Media Clips: Implementation of an Intuitive Media Linker; Seunghyun Yoon, Kyuyun Lee, Hyunchang Shin, Samsung Electronics, 2011 IEEE International Symposium on Broadband Multimedia Systems and Broadcasting (BMSB) held Jun. 8-10, 2011.

Mitrokotsa, A., et al., "Classification of Rfid Attacks", Proceedings of the 2nd International Workshop on Rfid Technology - Concepts, Applications, Challenges (IWRT 2008), in conjunction with the 10th International Conference on Enterprise Information Systems, pp. 73-86, Barcelona, Spain, Jun. 2008. INSTICC Press, Portugal. Retrieved from the Internet: <URL: http://www.cs.vu.nl/~ast/publications/iwrt-2008.pdf>.

Mobile Personal Devices meet Situated Public Displays: Synergies and Opportunities; Alan Dix, Corina Sas (2010). International Journal of Ubiquitous Computing (Ijuc), 1(1), pp. 11-28. http://www.hcibook.com/alan/papers/MPD-SPD-2010/.

Mulliner, Collin, "Attacking NFC Mobile Phones", 25th Chaos Communication Congress, Berlin, Germany (Dec. 2008). Retrieved from the Internet: <URL: http://www.mulliner.org/nfc/feed/collin_mulliner_25c3_attacking_nfc_phones.pdf>, 71 pgs.

Mulliner, Collin, "Vulnerability Analysis and Attacks on NFC-enabled Mobile Phones", 2009 International Conference on Availability, Reliability and Security, Fukuoka, Japan, Mar. 16-19, 2009, 695-700.

Near Field Communication in Smartphones, Simon Burkard, Berlin Institute of Technology, Germany, 2012.

Near Field Communications Handbook, volume 13 of Internet and Communications, 2009; Mohammad Ilyas.

Newport Digital Technologies to Implement Microsoft Licensing Agreement; Prepares to Launch First Ruggedized RFID Reader with Windows Mobile Operating System. Business Wire Oct. 20, 2009.

NFC and Mobile Payments Today, Andre Filipe de Axevedo Figueiredo Cruz, Nov. 2011.

NFC Data Exchange Format (NDEF), Technical Specification, NDEF 1.0,-Jul. 24, 2006.

NFC Forum Type Tags, White Paper V1.0, Apr. 1, 2009-Public.

NFC Mobile Parlor Games Enabling Direct Player to Player Interaction, 2011 Third International Workshop on Near Field Communication, Avinash Nandwani, Paul Coulton, Reuben Edwards.

NFC-Based Mobile Interactions with Direct-View Displays; Khoovirajsingh Seewoonauth, Enrico Rukzio, Robert Hardy, and Paul Holleis, IFIP Conference on Human-Computer Interaction—Interact 2009 pp. 835-838.

NFC-Cap Securty Assessment, vol. 1.0-May 11, 2009; Diego A. Ortiz-Yepes.

Ongtang, Machiagar, et al. "Semantically Rich Application-Centric Security in Android", Security and Communication Networks, vol. 5, Issue 6, Jun. 2012, 658-673.

Opoku, Samuel King, "Performance Enhancement of Large-Size NFC Multi-Touch System", Cyber Journals: Multidisciplinary Journals in Science and Technology, Journal of Selected Areas in Telecommunications (JSAT), (Oct. 2011), 52-57.

Oren, Y., "Attacks on RFID-Based Electronic Voting System", Cryptology ePrint Archive Report 2009/442 (2009). Retrieved from the Internet: <URL: http://eprint.iacr.org/2009/422.pdf>, 21 pgs.

Physical browsing with NFC technology; Heikki Ailisto, Tapio Matinmikko, Juha Haikio, Arto Ylisaukko-oja, Esko Strommer, Mika Hillukkala, Arto Wallin, Erkki Siira, Aki Poyry, Vili Tormanen, Tua Huomo, Tuomo Tuikka, Sonja Leskinen & Jarno Salonen, Espoo May 2007. VTT Tiedotteit—Research Notes 2400.

Programming Android; Zigurd Mednieks, Laird Domin, G. Blake Meike, Masumi Nakamura, O'Reilly Media, Inc., 2011, http://books.google.co.In/books?id=5BGBswAQSiEC&Ipg=PR5&ots=xSfgivFwS& dq=rogue%2ONFC%20active%20tags%2Ourl%2Ophone%2Opeer%20to%2Opeer&Ir&p. g=PA397#.

QR Code Tech Info: MECARD Format, May 2, 2011.

QRFactory, Redirectable QR, http://dashboard.qrfactory.com/,pulled from the internet Apr. 27, 2012.

Rahnama, Behnam, et al., "Securing RFID-Based Authentication Systems Using ParseKey+", Proceedings of the 3rd International Conference on Security of Information and Networks,_Taganrog,_Russia,_Sept._7-11,_2010,_212-217.

RFID based applications in culture, media and creative industries, 2011 Third International Workshop on Near Field Communication, Eileen Kuehn, Jens Reinhardt, Stephan Bergemann, Prof. Dr. Juergen Sieck.

RFID Inventory Management System. Package Printing, v57 n2, pp. 34. Feb. 2010.

Rieback, M.R., et al., "A Platform for RFID Security and Privacy Administration", Proceedings of the 20th USENIX/SAGE Large Installation System Administration conference (Lisa 2006), Washington D.C., (Dec. 2006). Retrieved from the Internet: <URL: http://www.rficleuardian.org/images/a/a9/Lisa.06.odf>, 14 pgs.

Rieback, M.R., et al., "The Evolution of RFID Security", Pervasive Computing (Jan.-Mar., 2006), 62-69.

Roland, M., "Security Vulnerabilities of the NDEF Signature Record Type", Presentation from WIMA 2011—NFC Research Track, Monaco (Apr. 19, 2011). Retrieved from the Internet: <URL: http://www.wima.mc/dan/2011/CONF_PDF/Tuesday/Am/Roland.pdf>, 14 pgs.

(56) References Cited

OTHER PUBLICATIONS

Roland, Michael, et al., "Digital Signature Records for the NFC Data Exchange Format", Second International Workshop on Near Field Communication, Monaco, Apr. 20, 2010, 7176.
Sabzevar, A.P., "Security in RFID Systems" Project report for GMU ECE 646 (2004). Retrieved from the Internet: <URL: http://teal.gmu.edu/courses/ECE646/project/ reports_2004/Sp-4_report.pdf>, 13 pgs.
Sarma, S.E., et al., "RFID Systems and Security and Privacy Implications", Ches 2002, LNCS 2523, B.S. Kaliski Jr. et al. (Eds.) (2003), pp. 454-469, 2003.
Secure contactless mobile financial services with Near Field Communication; Adeola Oluwaseyi Poroye, Aug. 2011.
Simple NDEF Exchange Protocol, Technical Specification, NFC Forum SNEP 1.0,-Aug. 31, 2011.
Situated Door Displays and how to interact with them, Barbara Schmid,-Jan. 16, 2012.
Smart Poster Record Type Definition Technical Specification NFC ForumTM SPR 1.1 NFCForum-SmartPoster_RTD_1.0, 2006-07-24.
Suh, J., "Introduction to composite electromagnetic noise absorber technology" EMC Directory & Design Guide, (2007), 4 pgs.
Switching the role of NFC tag and reader for the implementation of Smart Posters, 2012 4th International Workshop on Near Field Communication; Dirk Volland, Kay Noyen, Onur Kayikei, Lukas Ackermann, Florian Michahelles.
Thamilarasu G et al: "Intrusion detection in RFID systems", Military Communications Conference, 2008, pp. 1-7.
The "Weak Spots" in Stacked UHF RFID Tags in NFC Applications, IEEE RFID 2010; Xiaosheng Chen, Feng Lu, Terry T.Ye*.
The Junction Protocol for Ad Hoc Peer-to-Peer Mobile Applications; Computer Science Department Stanford University; Ben Dodson, Aemon Cannon, Te-Yuan Huang, Monica S. Lam, Apr. 2011.
The Mobile Phone as Digital SprayCan; Philip Garner, Omer Rashid, Paul Coulton, and Reuben Edwards, Proceedings of the 2006 ACM SIGCHI international conference on Advances in computer entertainment technology Article No. 12, Hollywood, California, USA—Jun. 14-16, 2006.
Touch-driven Interaction Between Physical Space and Cyberspace with NFC, Longbio Chen, Gang Pan, Shijian Li, Department of Computer Science, Zhejiang University Hangzhou, China, 2011 IEEE International Conferences on Internet of Things, and Cyber, Physical and Social Computing.
Turcu, C. (ed.), Development and Implementation of RFID Technology, In-Teh, I-Tech Education and Publishing KG, Vienna, Austria (Feb., 2009), 564 pgs.
Type 1 Tag Operation Specification, Technical Specification, Technical Specification, NFC Forum T1TOP 1.1,-Apr. 13, 2011.
Type 2 Tag Operation Specification Technical Specification, T2TOP 1.1 NFC Forum-May 31, 2011.
Type 3 Tag Operation Specification, Technical Specification, Technical Specification, NFC Forum, T3TOP 1.1, Jun. 28, 2011.
Valkkynen, Pasi, et al.,' Suggestions for Visualizing Physical Hyperlinks, Permid 2006: Pervasive Mobile Interaction Devices—Mobile Devices as Pervasive User Interlaces and Interaction Devices, Dublin, Ireland, May 7, 2006, 245-254.
Varshney, L.R., et al.., "Securing Inductively-Coupled Communication ", Information Theory and Applications Workshop (ITA) (Feb. 5-10, 2012), 6 pgs.
Vidano, R., "13.56-MHz Inductively Coupled Card Compatibility to Conducting Surfaces", Proceedings of Asia-Pacific Microwave Conference (2007), 4 pgs.
Violino, Bob. A Summary of RFID Standards. RFID Standards. RFID Journal. Jan. 16, 2005. URL at http://www.rfidjournal.com/articles/view?135.
Wang, J.J.H., "Spiral Antennas in RFID and Their Size Reduction and Performance Enhancement", 2007 IEEE International Workshop on Anti-counterfeiting, Security, Identification (Apr. 16-18, 2007), 44-47.
Wegleiter, H. et al., "Automatic Antenna Tuning Unit to Improve RFID System Performance", IEEE Transactions on Instrumentation and Measurement, vol. 60, No. 8,(Aug. 2011), 2797-2803.
Weis, Stephen A, "Security and Privacy Aspects of Low-Cost Radio Frequency Identification Systems", Security in Pervasive Computing 2003, LNCS 2802, D. Hutter et al. (Eds.) (2004) 201-212.
Yamada, I., et al., "Secure Active RFID Tag System", Ubicomp2005 Workshops, 5 pgs.
Zhu, H., et al., "Solutions of Metal Surface Effect for HF RFID Systems", 2007 International Conference on Wireless Communications, Networking and Mobile Computing (WiCom), (Sep. 21-25, 2007), 2089-2092.
Partial European Search Report dated Aug. 7, 2017 for European Application No. EP17000461 filed Mar. 21, 2017.
Domdouzis et al., "Radio-Frequency Identification (RFID) applications: A brief introduction," Advanced Engineering Informatics 21 (2007), pp. 350-355.

\* cited by examiner

SMART SIGN BOX USING ELECTRONIC INTERACTIONS

CROSS-REFERENCE TO RELATED APPLICATIONS

The present application claims priority from U.S. Provisional Patent Application Nos. 61/299,609 filed Jan. 29, 2010, and 61/311,473 filed Mar. 8, 2010, and is related to U.S. Provisional Application Nos. 61/416,384 filed Nov. 23, 2010, and 61/423,139 filed Dec. 15, 2010, all of which are incorporated herein by reference in their entireties.

TECHNICAL FIELD OF THE INVENTION

The present inventive subject matter relates generally to the art of graphic displays and/or signage.

BACKGROUND OF THE INVENTION

Illuminated signage and/or graphic displays are generally known. Commonly, illuminated signage will include graphic media, e.g., such as paper or polymeric film having a desired image thereon, that is illuminated from the back or the front or in some instances the side or edge. In general, backlight or backlit applications are those in which the media is illuminated from the side of the media that is opposite the side from which the media is intended to be viewed, while front-light or front-lit applications are those in which the media is illuminated from the same side in which the media is intended to be viewed. In side or edge-lit applications, the graphic media is generally mounted to a pane of glass or other suitable light guide which is illuminated from the edge or side. In turn, the pane of glass or other suitable light guide directs the light onto and/or through the graphic media.

In backlight applications, the graphic media is typically transparent, semitransparent or translucent. FIG. 1 shows a typical backlight application for illuminated signage. In particular, a graphic media 10 (e.g., having text, images, graphics or the like depicted or otherwise formed thereon) is held within a box or frame 12 or the like which contains a light source 14 that illuminates the graphic media 10 from behind, i.e., from the side of the media opposite the side intended for viewing. While such backlit signs or displays are generally acceptable, they do have certain limitations and/or drawbacks. For example, often such signs or displays are generally static or non-responsive to external stimuli. In many cases, there is no security feature to regulate the use of graphic media in the sign or display.

Accordingly, a new and/or improved media, display and/or method for using the same are disclosed which addresses the above-referenced problem(s) and/or others.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In accordance with one embodiment, an advertising system is described and includes a graphic supporting frame having an activatable light source. An advertising graphic having printed or imaged indicia is provided in connection with a marketing or advertising campaign. A RFID inlay is provided on the advertising graphic, the inlay includes a substrate having first and second surfaces, with an antenna and a chip disposed on the first surface. The chip is encoded with information relating to the advertising graphic. An activator is used for activating and reading the chip on the RFID inlay and for causing a first signal to be sent to the graphic supporting frame. A processor is provided for receiving the first signal and for transmitting a second signal to the activator.

In accordance with another embodiment, an advertising graphic having a graphic media with a printable surface. A RFID inlay is associated with the advertising graphic, the RFID inlay has a surface with a chip and antenna provided thereon. The RFID inlay is attached to the graphic media, the chip of the RFID inlay including information relating to the graphic media and an advertising message provided on the graphic media and matching to information contained on the chip on the RFID inlay.

In a yet still further exemplary embodiment of the presently described invention, a method of using an advertising system. The method includes the steps of initially providing a frame that has an illumination source, RFID reader and controller connected to the RFID reader. Then, producing a replaceable graphic, the graphic having advertising and/or marketing information provided on a surface of the graphic. Next, a RFID inlay is associated with the replaceable graphic, the RFID inlay having a chip encoded with product information and illumination instructions. Once an individual is sensed as being near the frame, the illumination source is increased in connection with the illumination instructions provided on the chip. If the individual has a mobile communication device, the device is positioned near the frame and the information encoded on the chip on the RFID inlay is read which generates information on the mobile communication device for the user to act on.

The foregoing embodiment, may also include the further steps of unlocking the display so as to be able to remove the replaceable graphic and providing an authentication code on the RFID chip. Reading the authentication code can enable the appropriate user to remove the replaceable graphic.

Numerous other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENTS

Figure 1:
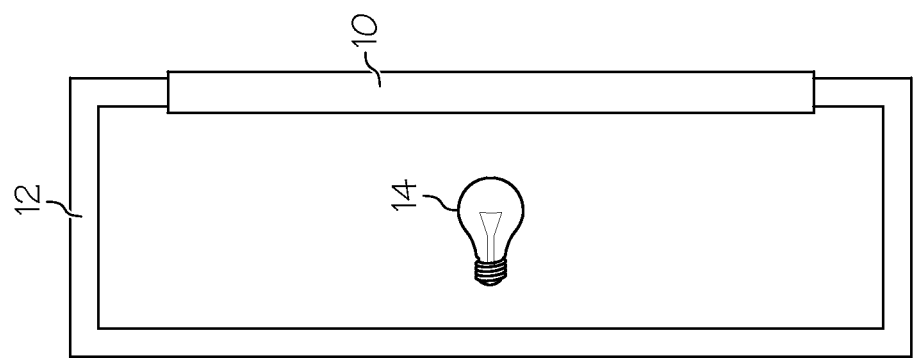
FIG. 1 is a diagrammatic illustration showing a conventional backlit display.

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

In general, there is disclosed herein a graphic display and/or illuminated sign. In particular, the display or sign holds or otherwise supports a graphic media intended to be viewed, e.g., by the public or some other desired audience. Suitably, the graphic media is, e.g., a paper, metal foils or films, or polymeric film having a desired image printed, laminated or otherwise formed thereon. The image may also be formed by perforating the film or foil using different perforation sizes or patterns to create the image. For example, the image may include, without limitation, text, graphics, photographic images and/or combinations of any of the foregoing. Depending on the application, the graphic media may be transparent, semi-transparent or translucent. The image may be multi-color, black and white or otherwise monotone.

In practice, the graphic media is selectively mounted in, on or to the display/sign, and from time-to-time can be changed as desired by a user of the display/sign. That is to say, one graphic media, e.g., having a first image printed or formed thereon, can be exchanged for another graphic media, e.g., having a second image printed or formed thereon or to inform the viewer of a change in condition, such as a sale or other promotion. That is, the image may remain the same but additional information may be provided with the original graphic. In this way, the display/sign can be updated or changed as desired by the user to present various different graphic media to the target audience. For example, the display/sign may be used to provide advertising that a user may wish to change from time-to-time. Accordingly, rather than replacing the entire display or sign, the user merely replaces the graphic media mounted thereto or otherwise held thereby.

Suitably, when mounted in, on or to the display or sign, the graphic media is selectively illuminated by one or more light sources. Optionally, the display or signage may be implemented as a backlit application, a front-lit application or a side or edge-lit application. The light source optionally comprises a light emitting diode (LED) or a collection of multiple LEDs. The LEDs can be conventional LEDs or organic LEDs. Alternately, other electroluminescent material can be employed as the light source or other conventional light sources may be employed, e.g., incandescent or fluorescent lighting. Optionally, a plurality of light sources are provided which each emit light at a different wavelength or a single light source is provided which is capable of emitting light at a plurality of different wavelengths. In one embodiment, the light source includes one or more layers or elements which produce different wavelengths of light. Suitably, by appropriate control of the light source or sources, the color and/or wavelength of the illumination can therefore be selected as desired. In one exemplary embodiment, the intensity of the illumination is also able to be selectively controlled.

In a suitable embodiment, one or more of a variety of power sources are optionally included to provide electrical power for the display/sign, e.g., to selectively power the light source or other electronic components. In one embodiment, the power source may be a solar cell or other like photovoltaic element. In another embodiment, the power source may be a battery, e.g., which may be rechargeable. Alternately, electrical power can be obtained for the display or sign via a conventional wall outlet or other like source operatively connected to an electrical mains or conventional power grid. In still another embodiment, electrical power is supplied to the display or signage via an equipped coil or loop of conductive wire or the like which is inductively or magnetically coupled, e.g., to an external drive circuit or the like. Suitably, an AC (alternating current) power signal is picked up from the drive circuit by the inductively and/or magnetically coupled conductive coil or loop equipped on or in the display/sign. Optionally, the power may be rectified and/or otherwise conditioned prior to its delivery to the light source and/or other electronic components of the display/sign. If a rechargeable battery is employed, optionally, it may be recharged via a photovoltaic or other suitable source, e.g., such as those mentioned herein.

The display or sign is also optionally equipped with an RFID (Radio Frequency IDentification) reader or other like communication device such as a near field communication device (NFC). Suitably, the reader is provisioned to communicate with an RFID device carried by the graphic media. Optionally, the RFID device carried by the graphic media is position thereon, so that when the graphic media is installed in or on the display/sign, the RFID device is sufficiently close to the reader (or an antenna thereof) to permit communication to be established between the RFID device and the reader. While referred to herein as a reader, it is to be appreciated that optionally the reader may also may selectively write and/or up-load data or information to the RFID device and/or program the RFID device.

For example, the RFID device may be integrated on or into the media itself or it may be implemented as a label or sticker which is applied to the media. Although the description herein mainly references RFID technology, it is to be appreciated that smartcard technology and/or other like technologies (e.g., that may be based on contact reading and writing of electronic information) are also contemplated and may be utilized for alternate embodiments in appropriate circumstances. However, the advantage of RFID technology and/or similar wireless communication technologies is that it provides greater freedom or leeway in the positioning of the RFID or other like device on the graphic media.

Suitably, the display and/or sign also includes a controller that regulates and/or otherwise controls operation of the display/sign. In one embodiment, the controller selectively controls the light source, e.g., to turn the illumination on or off, to control or vary the color or wavelength of emitted illumination, to control or vary the intensity of the illumination, etc. Optionally, the controller is in operative communication with and/or responsive to the reader, and accordingly controls operation of the display/sign based upon data, information and/or other communications received from the RFID device.

In one suitable embodiment, the RFID device is loaded with and/or otherwise contains authentication data. For example, the authentication data ensures that the graphic media is authentic or genuine. Optionally, upon verification of the authentication data obtained from the RFID device by the reader, the controller enables operation of the display/ sign. Alternately, if no valid authentication data is obtained, the controller may disable operation of the display/sign, e.g., by interrupting the delivery of electrical power to the light source or otherwise turning the light source off. Optionally, in response to the detection of authentication data from the RFID device, the controller may control a magnetic or other like lock which protects against unauthorized removal or installation of media.

In another suitable embodiment, the RFID device is loaded with and/or otherwise contains data or information related to illumination characteristics. For example, the data or information may indicate what color, wavelength or intensity or other characteristic of illumination is desired for the particular graphic media on which the RFID device is carried. Accordingly, the reader obtains this information from the RFID device and in turn the controller regulates the light source to achieve the indicated illumination characteristics. In other words, depending on the image depicted by the graphic media or the desired effect one wishes to achieve with the illumination, the RFID device is loaded with data or information indicating suitable illumination characteristics that meet the desired criteria, e.g., the color or wavelength of the illumination, the intensity of the illumination, etc. Of course, for different media or different media content or for different desired effects the RFID device can be selectively loaded or otherwise provisioned with different data or information indicating different desired illumination characteristics. Consequently, when the media carrying the RFID device is installed in or on the display, the reader obtains the data/information and the controller regulates the light source accordingly to achieve the characteristic illumination and/or desired effects specific to the particular media installed in or on the display.

Optionally, the illumination is actively controlled and the RFID device may be provisioned with information or data indicating the desired control sequence or control options or control responses to be executed in response to detected stimuli in order to achieve a desired effect for the particular media carrying the RFID device. For example, via appropriate control of the light source by the controller, the illumination may be cycled or otherwise varied through an array of different colors or wavelengths or the intensity of the illumination may be cycled or varied through an array of different levels. For example, in response to an internal or other clock, the controller may selectively turn the illumination on and off, e.g., such that the signage is illuminated during evening or otherwise dark hours and is not illuminated during daytime or light hours, and thusly the display conserves power. Alternately, the display may be equipped with an ambient light sensor and the controller programmed or otherwise provisioned to turn the illumination on when the detected ambient light falls below a set or otherwise determined threshold, while otherwise leaving or turning off the illumination when the detected ambient light remains or rises above the threshold. In yet another embodiment, the intensity of the illumination from the light source can be controlled by the controller in response to the ambient lighting conditions detected by the light sensor.

In yet another embodiment, the display is optionally equipped or otherwise provisioned with a passive infrared (PIR) sensor or other motion sensor to detect the presence of individuals near the display. Accordingly, the controller can then operate the display in response to the detection of a nearby person or persons. For example, the light source can be turned on or the illumination intensity increased when an individual or audience is detected and the light source can be turned off or the illumination intensity decreased when nobody is detected, thusly the display conserves power when it is not being viewed.

In one suitable option, the light source may provide illumination outside the visible wavelength, e.g., such as UV (ultraviolet) or IR (infrared) illumination. In turn, the graphic media may be printed with a fluorescent ink or otherwise provided with fluorescent material that glows or fluoresces in response to the foregoing illumination. In this way, the visual appeal may be enhanced and/or the appearance of motion may be provided.

In yet another embodiment, an RFID or other like device carried by the media may be programmed or otherwise provisioned to communicate with viewers' mobile phones and/or other communication devices (e.g., a personal digital assistant (PDA) or the like) carried by viewers of the display/sign, for example, using the Near Field Communication (NFC) standard or another suitable standard. Accordingly, for example, when a mobile phone or other device with an integrated NFC or like reader is placed near the RFID or other like device carried on or by the media, it will download content, e.g., relevant to the media, such as data, music or a video or a discount coupon for a product advertised by the media, etc.

Figure 2:
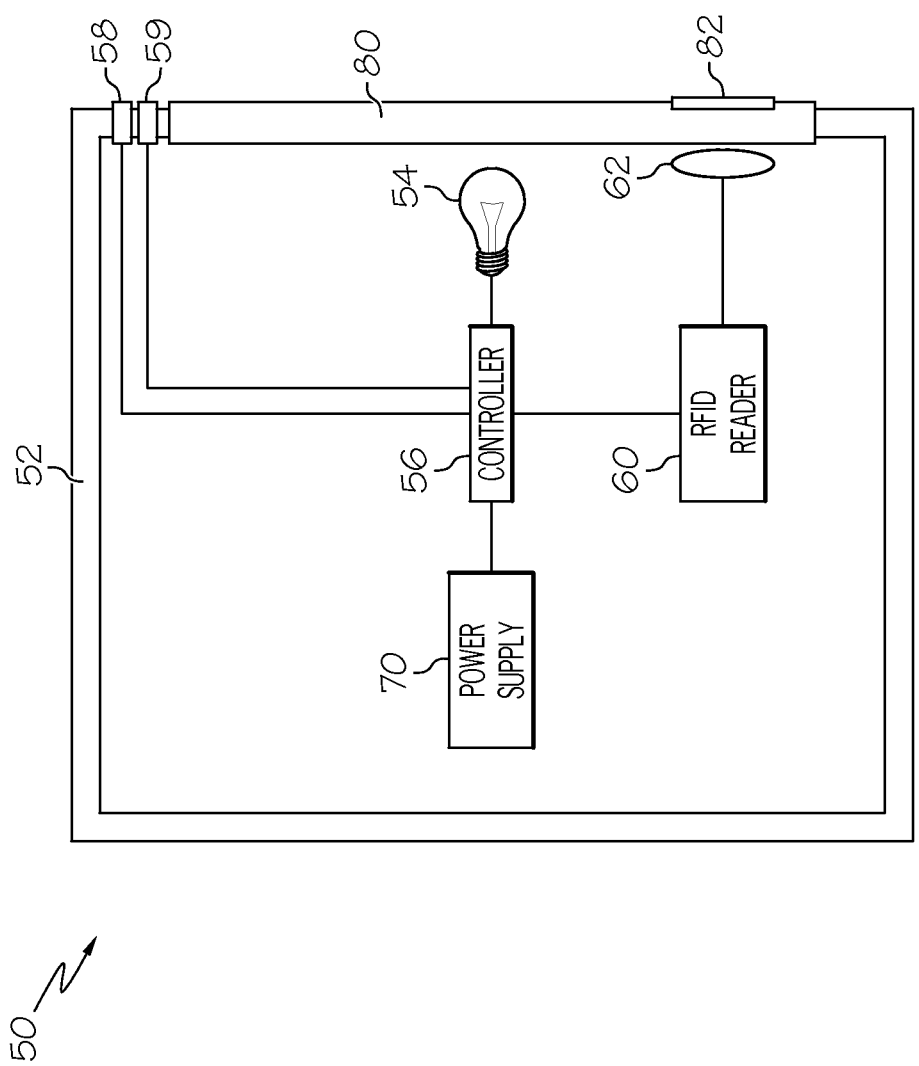
FIG. 2 is a diagrammatic illustration showing an exemplary backlit display in accordance with aspects of the present inventive subject matter.

With reference now to FIG. 2, there is shown an exemplary configuration for an illuminated sign or display 50 suitable for practicing aspects of the present inventive subject matter. As shown, the display 50 includes a box or frame 52 which holds or otherwise supports a selectively replaceable graphic media 80, e.g., carrying an RFID communication device 82. Optionally, the media 80 is mounted to or supported on or next to a major surface of a pane of glass or other like light transmitting material. In the box or frame 52 or otherwise behind the media 80, the display 50 includes is a light source 54 that selectively illuminates the media 80 from a backside or rear thereof. That is to say, the media 80 is illuminated from the side thereof which is opposite the side of the media 80 from which the media 80 is intended to be viewed. In any event, while the illustrated embodiment depicts a backlit application, it is to be appreciated that the present inventive subject matter is equally amenable to a front-lit or edge-lit application. Accordingly, the light source 54 may alternately be arranged on the front side of the media 80 or at some location along the edge of the media 80.

Figure 3:
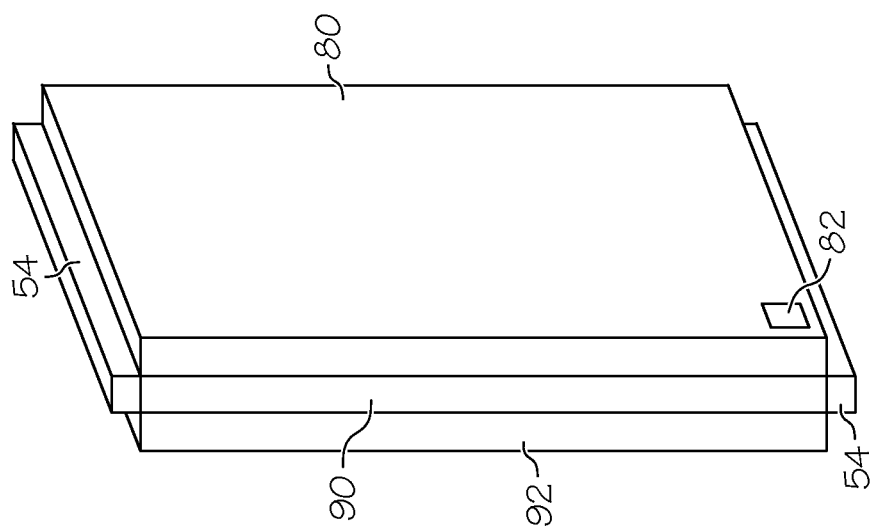
FIG. 3 is a diagrammatic illustration showing an exemplary edge-lit display configuration suitable for practicing aspects of the present inventive subject matter.

For example, FIG. 3 shows an exemplary edge-lit configuration. In the illustrated configuration, the media 80 is supported on a first major surface of a pane of glass or other suitable light guide 90, and the light source 54 includes two sources arranged at the edges or sides of the light guide 90. Optionally, a light scattering and/or reflective film or laminate 92 is support on a second major surface of the light guide 90, opposite the first major surface. Accordingly, illumination from the light source 54 is launched into the light guide 90 and in turn directed therethrough to the graphic media 80 to illuminate the media.

Suitably, the graphic media 80 is, e.g., a paper, foil or polymeric film or laminate having a desired image or content printed or otherwise formed thereon. For example, the image may include, without limitation, text, graphics, photographic images and/or combinations of any of the foregoing. Depending on the application, the graphic media 80 may be transparent, semi-transparent or translucent. The image or content may be multi-color, black and white or otherwise monotone. In addition, the graphic or image for the graphic may be formed by creating a pattern of perforations, holes, slits which may be of a similar or different shape. In addition, a printed image can be combined with a perforation pattern.

For clarity and simplification, the light source 54 has been illustrated as a single element in FIG. 2. However, as described above, the light source 54 may in practice be composed of multiple elements or sources. For example, the light source 54 optionally comprises an LED or a collection of multiple LEDs. The LEDs can be conventional LEDs or organic LEDs. Alternately, other electroluminescent material can be employed as the light source 54 or other conventional light sources may be employed, e.g., incandescent or fluorescent lighting. Optionally, a plurality of light sources are provided which each emit light of a different wavelength or color or a single light source is provided which is capable of selectively emitting light at a plurality of different wavelengths. Accordingly, by appropriate control of the light source 54, the color and/or wavelength of the illumination can therefore be selected as desired.

As shown in FIG. 2, the display 50 also includes a controller 56, an RFID reader 60 (including an antenna 62) and an electrical power supply 70. Suitably, the power supply 70 provides electrical power for the light source 54 and/or the other electronic components of the display 50. As shown, the electrical power supplied to the light source 54 is regulated by the controller 56. Accordingly, the controller 56 is able to selectively turn the light source 54 on or off, and the intensity of illumination provided from the light source 54 may also be controlled by the controller 56. Additionally, the controller 56 may also selectively control the color and/or wavelength of illumination provided from the light source 54. In one suitable embodiment, the light source 54 may provide illumination outside the visible wavelength, e.g., such as UV (ultraviolet) or IR (infrared) illumination. In turn, the graphic media 80 may be printed with a fluorescent ink or otherwise provided with fluorescent material that glows or fluoresces in response to the foregoing illumination. In this way, the visual appeal may be enhanced and/or the appearance of motion may be provided.

In suitable embodiments, the power supply 70 is optionally implemented in one or more of a variety of different ways. In one embodiment, the power source 70 may be a solar cell or other like photovoltaic element. In another embodiment, the power source 70 may be a battery, e.g., which may be rechargeable. Alternately, electrical power can be obtained for the display or sign 50 via a conventional wall outlet or other like source operatively connected to an electrical mains or conventional power grid. If a rechargeable battery is employed, optionally, it may be recharged via a photovoltaic or other suitable source, e.g., such as those mentioned herein.

Figure 4:
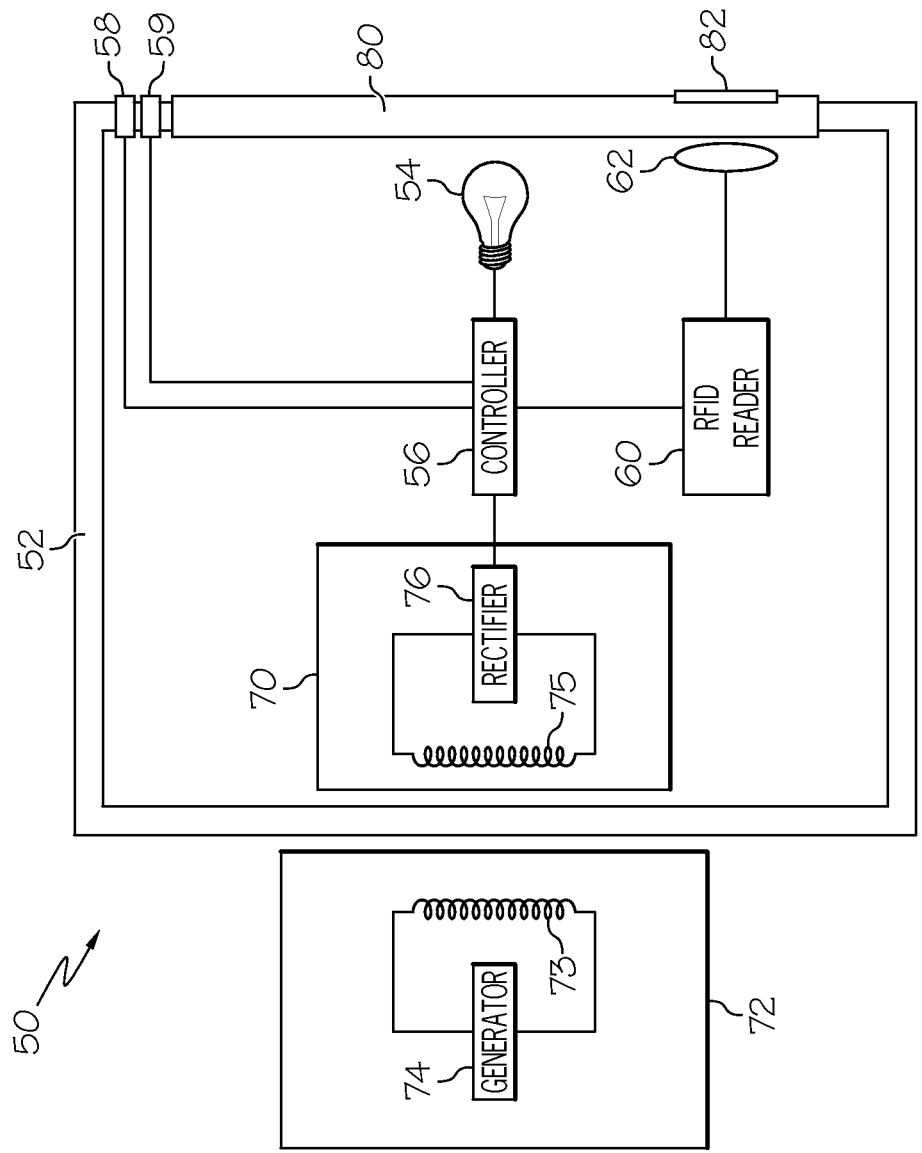
FIG. 4 is a diagrammatic illustration showing an exemplary configuration of a power supply for the display shown in FIG. 2.

With reference to FIG. 4, in still another embodiment, electrical power is supplied to the display 50, e.g., via an external drive circuit 72 or the like. Suitably, the external drive circuit 72 may optionally include a coil or loop of conductive wire 73 driven by a generator 74 or other suitable electric power source to produce, e.g., an AC power signal. Accordingly, the power supply 70 picks-up the AC power signal with a coil or loop of conductive wire 75 or the like which is inductively or magnetically coupled to the external drive circuit 72, e.g., via the drive circuit's coil or loop of conductive wire 73. Optionally, the power may be rectified (e.g., via a rectifier 76) and/or otherwise conditioned prior to its delivery to the light source 54 and/or other electronic components of the display/sign 50. Using a configuration such as the exemplary configuration shown in FIG. 4, e.g., allows the display 50 to be mounted on the outside of a wall or surface with the drive circuit 72 on the other side, or placed on top of a stand with the drive circuit 72 underneath.

Returning attention to FIG. 2, the RFID reader 60 is, as described above, operatively connected to and/or in communication with the controller 56. Again, while referred to herein as a reader, it is to be appreciated that optionally the reader 60 may also selectively write and/or up-load data or information to the RFID device 82 and/or program the RFID device 82. Optionally, the display 50 additionally includes a motion sensor 58 (e.g., such as a PIR sensor) and/or an ambient light sensor 59, either or both also being operatively connected to and/or in communication with the controller 56.

Suitably, the RFID device 82 carried by the graphic media 80 is positioned thereon, so that when the graphic media 80 is installed in or on the display/sign 50, the RFID device 82 is within range of the reader 60 (or the reader's antenna 62) to permit communication to be established between the RFID device 82 and the reader 60. Optionally, the RFID device 82 may be integrated on or into the media 80 itself, such as being laminated into the material or it may be implemented as a label or sticker which is applied to the media 80. The label or tag may be removable from the graphic so as to allow recycling.

In practice, the controller 56 is optionally implemented as a microprocessor or the like that regulates and/or otherwise controls operation of the display/sign 50. In various embodiments, the controller 56 selectively controls the light source 54, e.g., to turn the illumination on or off, to control or vary the color or wavelength of emitted illumination, to control or vary the intensity of the illumination, etc. Again, the controller 56 is optionally in operative communication with and/or responsive to the reader 60, and accordingly controls operation of the display/sign 50 based upon data, information and/or other communications received from the RFID device 82.

In one embodiment, the RFID device 82 is loaded with and/or otherwise contains authentication data. For example, the authentication data may be an otherwise secret alphanumeric code or the like that ensures that the graphic media 80 is authentic or genuine. Optionally, upon verification of the authentication data obtained from the RFID device 82 by the reader 60, the controller 56 enables operation of the display/sign 50. Alternately, if no valid authentication data is obtained, the controller 56 may disable operation of the display/sign 50, e.g., by interrupting the delivery of electrical power to the light source 54 or otherwise turning the light source 54 off. Optionally, in response to the detection of valid or invalid authentication data from the RFID device 82, the controller 56 may control (i.e., selectively engage or disengage) a magnetic or other like lock (not shown). For example, this lock could limit access to an interior or other location or portion of the display 50 or could limit the operation of or access to manual controls, e.g., such as a master on/off or power switch.

Optionally, as described above, the RFID device 82 is loaded with and/or otherwise contains data or information related to illumination characteristics. For example, this data or information may indicate what color, wavelength or intensity or other characteristic of illumination is desired for the particular graphic media 80 on which the RFID device 82 is carried. Therefore, when the media 80 carrying the RFID device 82 is installed in the display 50, the reader 60 obtains this information from the RFID device 82 and in turn the controller 56 regulates the light source to achieve the indicated illumination characteristics. In other words, depending on the image or content on the graphic media 80 or the desired effect one wishes to achieve with the illumination, the RFID device 82 is loaded with data or information indicating suitable illumination characteristics that meet the desired criteria, e.g., the color or wavelength of the illumination, the intensity of the illumination, etc. Of course, for different media or different media content or for different desired effects, the RFID device 82 can be selectively loaded or otherwise provisioned with different data or information indicating different desired illumination characteristics. Consequently, when the media 80 carrying the RFID device 82 is installed in or on the display 50, the reader 60 obtains the data/information and the controller 56 regulates the light source 54 accordingly to achieve the characteristic illumination and/or desired effects specific to the particular media 80 installed in or on the display 50.

Again, as described above, the illumination is optionally actively controlled and the RFID device 82 may be provisioned with information or data indicating the desired control sequence or control options or control responses to be executed in response to detected stimuli in order to achieve a desired effect for the particular media 80 carrying the RFID device 82. For example, via appropriate control of the light source 54 by the controller 56, the illumination may be cycled or otherwise varied through an array of different colors or wavelengths or the intensity of the illumination may be cycled or varied through an array of different levels. For example, in response to an internal or other clock (not shown), the controller 56 may selectively turn the illumination on and off, e.g., such that the signage is illuminated during evening or otherwise dark hours and is not illuminated during daytime or light hours, and thusly the display 50 conserves power. Alternately, in response to the level of ambient light detected by the ambient light sensor 59, the controller 56 may be programmed or otherwise provisioned to turn the illumination on when the detected ambient light falls below a set or otherwise determined threshold, while otherwise leaving or turning off the illumination when the detected ambient light remains or rises above the threshold. In yet another embodiment, the intensity of the illumination from the light source 54 can be controlled by the controller 56 in response to the ambient lighting conditions detected by the light sensor 59. Optionally, the forgoing thresholds, on/off times, etc. may be values stored in the RFID device 82 or otherwise set by the controller 56 in accordance with data obtained from the RFID device 82. The RFID device and controller can be used as part of a power conversation feature as well as a security feature providing lighting during times of darkness such as at the entry of a door or the like.

In yet another embodiment, the controller 56 operates the display 50 in response to the detection of a nearby person or persons, e.g., via the motion sensor 58. For example, the light source 54 can be turned on or the illumination intensity increased when an individual or audience is detected and the light source 54 can be turned off or the illumination intensity decreased when nobody is detected, thus the display 50 conserves power when it is not being viewed.

In still another optional embodiment, an RFID device 82 carried by the media 80 may be programmed or otherwise provisioned to communicate with a viewer's mobile phone and/or other communication device (e.g., a personal digital assistant (PDA) or the like), for example, using the NFC standard or another suitable standard. Accordingly, for example, when a mobile phone or other device with an integrated NFC or like reader is placed near the RFID device 82 carried on or by the media 80, it will download content, e.g., relevant to the media, such as data, music or a video or a discount coupon for a product advertised by the media, etc.

Optionally, the RFID device 82 may be any conventional RFID device as is generally known in the art, e.g., including RFID receivers, transmitters and/or transponders (collectively referred to herein as RFID "devices"). In a suitable embodiment, the RFID device 82 may includes a number of components including an antenna for wirelessly transmitting and/or receiving RF (Radio Frequency) signals and analog and/or digital electronics operatively connected thereto. The RFID device 82 may be a so called active or semi-passive RFID device and may also include a battery or other suitable power source. In conventional parlance, the RFID electronics along with any operatively connected antenna and/or power source are collectively referred to as the RFID inlay. Exemplary RFID inlays are available from Avery Dennison RFID Company of Clinton, S.C.

Suitably, the electronics are implemented via an integrated circuit (IC) or microchip or other suitable electronic circuit and may include, e.g., communications electronics, data memory, control logic, etc. In operation, the IC or microchip functions to store and/or process information, modulate and/or demodulate RF signals, as well as optionally performing other specialized functions.

As discussed above, the RFID reader 60 is generally used to wirelessly obtain data or information communicated from an RFID device 82. The manner in which the RFID reader 60 interacts and/or communicates with the RFID device 82 generally depends on the type of RFID device. Suitably, the RFID device 82 may be a passive device, an active device, a semi-passive device (also known as a battery-assisted or semi-active device).

A passive RFID device actives when the RFID reader 60 is nearby to power the RFID device 82, e.g., via wireless illumination of the RFID device 82 with an RF signal and/or electromagnetic energy from the RFID reader 60. Conversely, a semi-passive or active RFID device is provided with its own power source (e.g., such as a small battery or capacitor). To communicate, the RFID device 82 responds to queries or interrogations received from the RFID reader 60. Optionally, the response is achieved by backscattering, load modulation and/or other like techniques that are used to manipulate the RFID reader's field. Suitably, backscatter is used in far-field applications (i.e., where the distance between the RFID device 82 and reader 60 (or reader's antenna 62) is greater than approximately a few wavelengths), and alternately, load modulation is used in near-field applications (i.e., where the aforementioned distance is within approximately a few wavelengths).

Suitably, if the RFID device 82 is a passive RFID device, then it will signal or communicate its respective data or information by backscattering a carrier wave from the RFID reader 60. That is to say, in the case of a passive RFID device, in order to retrieve information therefrom, the RFID reader 60 typically sends an excitation signal to the RFID device 82. The excitation signal energizes the RFID device 82 which transmits the information stored therein back to the RFID reader 60. In turn, the RFID reader 60 receives and decodes the information from the RFID device 82.

As mentioned earlier, a passive RFID device generally has no internal power supply, although in some instances, the device can be provided with a capacitor to store energy to allow the RFID device to have enough energy to transmit the data on the chip back to the reader. Power for operation of a passive RFID device is provided by the energy in the form of the incoming RF signal received by the RFID device 82 from the RFID reader 60. Generally, a small electrical current induced in the antenna of the RFID device 82 by the incoming RF signal provides just enough power for the IC or microchip in the RFID device 82 to power up and transmit a response. Accordingly, in this case, the antenna of the RFID device 82 is generally designed both to collect power from the incoming signal and also to transmit the outbound backscatter signal. Notably, a passive RFID device has the advantage of simplicity and long life (e.g., having no battery to go dead).

Alternately, the RFID device 82 may be an active RFID device, as opposed to passive one. Suitably, an active RFID device 82 is provisioned with its own transmitter and a power source (e.g., a battery, photovoltaic cell, etc.). In essence, an active RFID device employs the self-powered transmitter to broadcast a signal which communicates the information stored on the IC or microchip in the RFID device. Optionally, an active RFID device will also use the power source to power the IC or microchip employed therein.

In yet another embodiment, the device 82 may be a semi-passive RFID device, which is similar to an active device in that it is provisioned with its own power source, but the battery or capacitor in this case may power the IC or microchip as well as to provide energy to broadcast the signal. Like a passive RFID device, the response from the semi-passive RFID device 82 is powered by means of backscattering the RF energy received from the RFID reader 60, i.e., the energy is reflected back to the reader 60 as with passive devices. In a semi-passive RFID device, the battery may also serve as a power source for data storage.

Optionally, the RFID device 82 operates in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). Suitably, if a passive RFID device is employed, it may optionally operate in any one of the aforementioned frequency ranges. In exemplary embodiments, for example, where a passive device 82 is employed: in a LF system, the device 82 may operate at around 124 kHz, 125 kHz or 135 kHz; in a HF system, the device 82 may operate at around 13.56 MHz; and, in a UHF system, the device 82 may use a band anywhere from 860 MHz to 960 MHz. Alternately, a passive device system may also use 2.45 GHz and other areas of the radio spectrum. If an active RFID device 82 is employed, suitably it may operate at around 455 MHz, 2.45 GHz, or 5.8 GHz, and a semi-passive device 82 may use a frequency around 2.4 GHz.

The read range of the RFID device 82 (i.e., the range at which the RFID reader 60 can communicate with the RFID device 82) is generally determined by many factors, e.g., the type of device (i.e., active, passive, etc.). For example, a passive LF RFID device (also referred to as a LF device) may be read from within approximately 12 inches (0.33 meters); a passive HF device (also referred to as a HF device) may be read from up to approximately 3 feet (1 meter); and a passive UHF RFID device (also referred to as a UHF device) may be read from approximately 10 feet (3.05 meters) or more. One factor influencing the read range for a passive RFID device 82 is the method used to transmit data, i.e., the coupling mode between the device 82 and the reader 60—which may optionally be inductive coupling, capacitive or radiative/propagation coupling. In the case of a passive LF device or a passive HF device, optionally inductive coupling is used between the device 82 and the reader 60. Alternately, e.g., where a passive UHF device is employed, radiative or propagation coupling may be used between the device 82 and the reader 60.

In inductive coupling applications (e.g., as may be used by a passive LF or HF device), the device 82 and reader 60 are typically each provisioned with a coil or loop antenna that together form an electromagnetic field therebetween. In inductive coupling applications, the device 82 draws power from the field, uses the power to run the circuitry on the device's IC or microchip and then changes the electric load on the device antenna. Consequently, the reader antenna 62 senses the change or changes in the electromagnetic field and converts these changes into data that is understood by the reader 60 or adjunct processor (e.g., the controller 56). Because the coil/loop in the device antenna and the coil/loop in the reader antenna 62 form an electromagnetic field therebetween in order to complete the inductive coupling between the device 82 and the reader 60, the device 82 has to be somewhat in the proximity of the reader antenna 62.

Alternately, in radiative or propagation coupling applications (e.g., as may be used by a passive UHF device), rather than forming an electromagnetic field between the respective antennas of the reader 60 and device 82, the reader 60 emits electromagnetic energy which illuminates the device 82. In turn, the device 82 gathers the energy from the reader 60 via its antenna, and the device's IC or microchip uses the gathered energy to change the load on the device antenna and reflect back an altered signal, i.e., backscatter. Suitably, if a UHF device is used, it can optionally communicate data in a variety of different ways, e.g., it can increase the amplitude of the reflected wave sent back to the reader 60 (i.e., amplitude shift keying), shift the reflected wave so its out of phase with respect to the received wave (i.e., phase shift keying) or change the frequency of the reflected wave (i.e., frequency shift keying). In any event, the reader 60 picks up the backscattered signal (e.g., via antenna 62) and converts the altered wave into data that is understood by the reader 60 or adjunct processor (e.g., the controller 56).

The coupling of the RFID device 82 to the reader 60 can be impacted by a number of factors such as any metal in the frame of the supporting structure, moisture, the material contained in the graphic (if for example a holographic foil is used in the graphic and the like.).

In practice, the media 80 may optionally be printed and/or cut, e.g., by a print shop or the like. Suitably, it will have the RFID device 82 mounted at certain location (e.g., in a certain corner) on the media 80 which corresponds to where the antenna 62 of the reader 60 is located in the display 50. Accordingly, the media 80 after being loaded into the display or sign 50 will have the RFID device 82 in relatively close proximity to the reader 60 (or its antenna 62) such that the device is within the read range of the reader, so that they can communicate or otherwise interact. Optionally, desired data or information (e.g., authentication codes, desired illumination characteristics, etc.) may be written into the RFID device 82 at the print shop.

It is to be appreciated, the presently described authentication model serves a number of purposes to the benefit of various parties by ensuring that only authentic or genuine media 80 is used within a given display or sign 50. For example, a sign shop can sell a display or sign 50 which is operative as intended only in conjunction with media 80 bearing an RFID device 82 having the proper authentication data or credentials provisioned therein. Accordingly, the sign shop benefits from the repeat business of a sign purchaser or other user seeking to replace old media 80 with new media 80 that is also compatible (i.e., also bears an RFID device 82 with the proper authentication credentials) with a display or sign 50 previously purchased from the sign shop. Additionally, the user benefits from knowing that the media 80 is genuine and/or authentic, and accordingly the quality of the media and/or its suitability for use in the display or sign 50 can be inferred.

In one suitable embodiment, the RFID device 82 optionally contains one or more specific authentication codes or the like. Accordingly, when the media 80 is installed in display or sign 50, the reader 60 will attempt to obtain one or more of the authentication codes. Suitably, any obtained codes are in turn passed to the controller 56 for verification of their authenticity. After processing the information, the controller 56 can decide if it allows the media 80 to be used (e.g., enables illumination of the media 80 or turns on the light source 54) or not to be used (e.g., disables illumination of the media 80 or turns off the light source 54). For example, the controller 56 optionally controls a relay, which regulates and/or controls the delivery of electrical power and/or current from the power supply 70 to the light source 54.

Optionally, the authentication code may be a fixed code that is specific to a particular media supplier or specific to a particular print or sign shop. Suitably, the print or sign shop applies the RFID device to the media 80 after printing and cutting. Accordingly, optionally, the media supplier besides supplying the rolls of media may also supply the RFID devices to be used with the media.

Of course, some users or other individuals may be tempted to circumvent the proposed authentication model described herein. For example, a user may attempt to remove an old RFID device 82 from a previously used genuine media 80 and then re-apply it to or otherwise use it along with a new potentially non-genuine media. To guard against unwanted circumvention of this type, there a number of suitable solutions. For example, the reader 60 (which also optionally functions as an RFID writer) optionally erases the authentication code from RFID device 82 after it has been read once to activate, or after a period of time has elapsed and/or otherwise enable the display or sign 50. In another embodiment, the reader 60 and/or controller 56 will allow the same code to be used some limited number of times, but after that a different code is must be obtained to enable or illuminate the display or sign 50 yet a further time, or after a set or determined number of readings, a given code can be erased or deleted. In yet another embodiment, an adhesive used to secure the RFID device 82 to the media 80 can be such that the RFID device 82 will be destroyed or damaged to the point of inoperability if one attempts to remove or peel the RFID device 82 from the media 80 upon which it was originally adhered. In yet another suitable embodiment, the RFID device 82 is optionally provisioned with a set date or determined time period (e.g., about a week) or other expiration criteria (e.g., which may set and/or updated by the printer or sign shop), so that the RFID device 82 or any authentication code thereon will only work or be valid prior to and/or within the bounds of the expiration criteria. This latter method can also be used to ensure that the media 80 in the display 50 is promptly and/or otherwise regularly replaced.

Optionally, the RFID device 82 may be provisioned to wirelessly communicate and/or otherwise interact with electronic communication devices carried by viewers of the display or sign 50 or other nearby individuals. For example, using the NFC standard or the like, the display or sign 50 may selectively communicate or otherwise interact via the RFID device 82 with a NFC or similarly enabled cell phone or other like handheld device (e.g., PDA). For example, using such a cell phone or other handheld device, a viewer can just point their cell phone or the like toward the display 50 or otherwise hold it sufficiently near the device 82, then with the RFID function, the cell phone or the like may be able to link to a website related or associated with the advertising or other content on the graphic media 80, bring up a coupon, or perform some other desired function.

Optionally, the NFC device employed for interaction with the viewers' cell phone or other like handheld device can be a separate element or tag or label, e.g., that may be similar to but different from the device 82 that is used to authenticate the source of media 80. In this case, two devices can be used, i.e., one for authentication and one for communication with viewer devices. In one suitable embodiment, a single label can be provisioned with two RFID tags or devices. The first tag or device (i.e., device 82) is used for authentication with an authentication code, and will only interact with the reader 60 in the sign or display 50 to authenticate the printing media 80, e.g., so as to enable the sign 50 to light up. The second tag or device can be written to or provisioned, e.g., by a sign shop or other entity, to support NFC interaction with consumer electronics such as NFC enable cell phones. Accordingly, the second tag or device will only interact with consumer electronics. Optionally, the content provided by the second tag or device can be SMS (Short Message Service) code or the like which is linked to or associated with the graphical content of the media 80. Optionally, the two tags or devices can be stuck or otherwise linked together so if somebody tries to tamper with one, the other one will stop functioning. For example, the two functions carried by two tags could be placed into one chip and one tag will be used. Optionally, using an appropriate chip, one can find a space to write (and lock) the authentication code into a memory separate from the space used by the NFC function. Alternatively, if two tags are employed, one could make a special inlay with two chips connected to the same antenna, which would difficult to forge.

As pointed out earlier, the reader 60 also optionally functions to write to the RFID device so as to up-load and/or otherwise write data or information to the RFID device 82. Accordingly, the RFID device is optionally loaded (e.g., periodically or as otherwise desired) with usage information from the sign or display 50. For example, the reader 60 may optionally write back to the RFID device 82 carried by the media 80 how many hours the illumination has been active, the date and/or time when the media 80 was installed or removed, the number of times the display 50 was activated or the number of times the light source 54 was turned-on, the number of times the motion sensor 58 and/or the ambient light sensor 59 was tripped, etc. Accordingly, for example, an owner or advertiser employing the sign 50 could obtain feedback about the actual operation of the sign 50. As can be appreciated, such feedback is reasonably related to the traffic in the vicinity of the sign 50 and/or the amount or degree of exposure the installed media 80 would have to a target audience or potential viewers. Suitably, such feedback could be used as the basis for calculating and/or accessing a usage fee or the like for the display 50.

Figure 5:
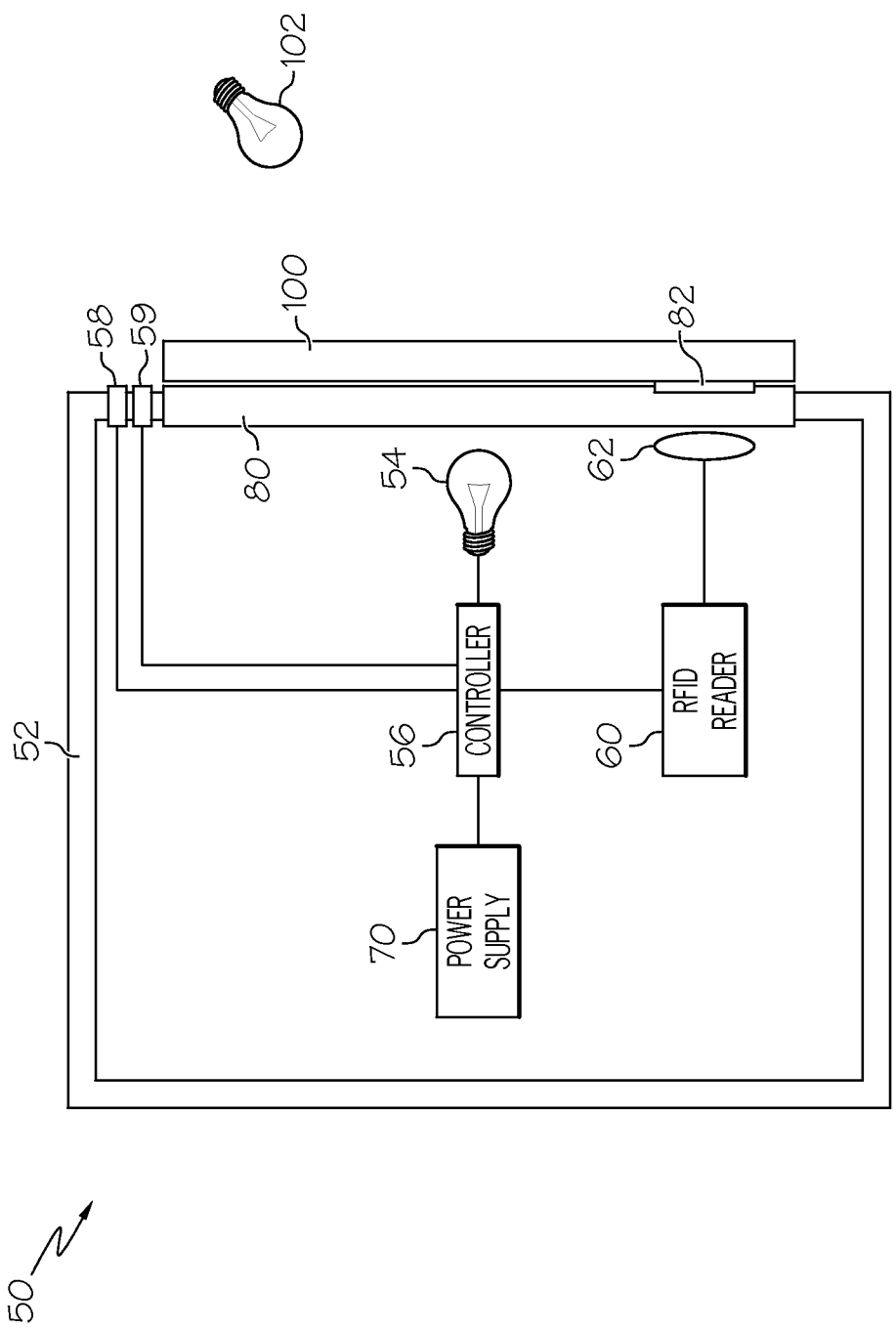
FIG. 5 is a diagrammatic illustration showing an exemplary display configuration in accordance with aspects of the present inventive subject matter, including an optional mirror or half-mirror cover.

With reference now to FIG. 5, in one optional embodiment, a mirror or half-mirror or other like cover 100 may be arranged in front of the display or sign 50, e.g., between a viewer and the graphic media 80. A second light source 102 may also optionally be positioned on the front side of the cover 100. Suitably, by controlling the relative illumination on either side of the cover 100, e.g., by controlling the light intensity from the internal light source 54 of the display 50 and the light intensity from the exterior light source 102, the effective reflectivity or reflectiveness of the cover 100 may be selectively manipulated. For example, at one extreme (e.g., with the interior light source 54 tuned off and the exterior light source 102 tuned on), the effective reflectivity or reflectiveness of the cover 100 can be maximized so that an individual viewing the display 50 perceives his own reflection, and at the other extreme (e.g., with the interior light source 54 turned on and the exterior light source 102 turned off), the effective reflectivity or reflectiveness of the cover 100 can be minimized so that an individual viewing the display 50 perceives the graphic media 80. Of course with a balance of illumination from either side of the cover 100, a viewer is optionally able to perceive both his reflection and the content of the graphic media 80. For example, the graphic media 80 may depict some apparel item such that the combination of the reflected image of the viewer and the image of the graphic media 80 combine to give the appearance of the viewer wearing the apparel item. In one suitable embodiment, the reflectivity or reflectiveness may optionally be manipulated in response to the motion sensor 58 detecting the presence of an individual in the proximity of the display 50.

Figure 6:
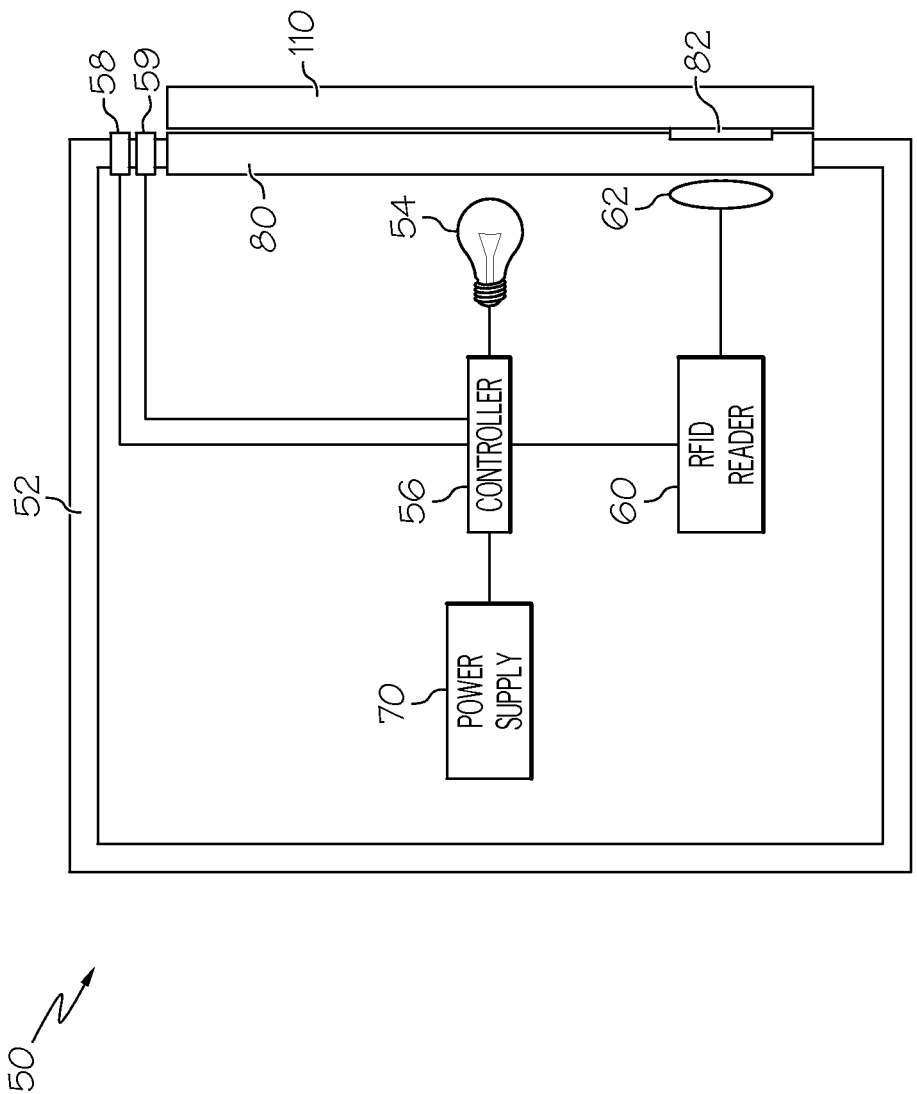
FIG. 6 is a diagrammatic illustration showing an exemplary display configuration in accordance with aspects of the present inventive subject matter, including an optional shutter.

With reference now to FIG. 6, in yet another embodiment, the display 50 is optionally equipped with a shutter 110 (optionally an electronic shutter), e.g., arranged on the front side of the media 80 (i.e., between the media 80 and potential viewers). Suitably, an electronic shutter may be implemented via, e.g., a transmissive LCD (liquid crystal display) panel. Accordingly, the LCD panel or shutter 110 or portions thereof are selectively darkened or closed to obscure the media 80 or corresponding portions thereof positioned behind the panel or shutter 110. In this manner, the media 80 or portions thereof are made selectively viewable (e.g., through the open shutter or undarkened/transmissive portions thereof) by appropriate control of the LCD panel or shutter 110. Suitably, the LCD panel or shutter 110 is powered by the power supply 70 or alternately it may be equipped with its own separate power supply. Optionally, the shutter 110 may be controlled by the controller 56 in response to data or information obtained from the RFID device 82 by the reader 60.

Figure 7:
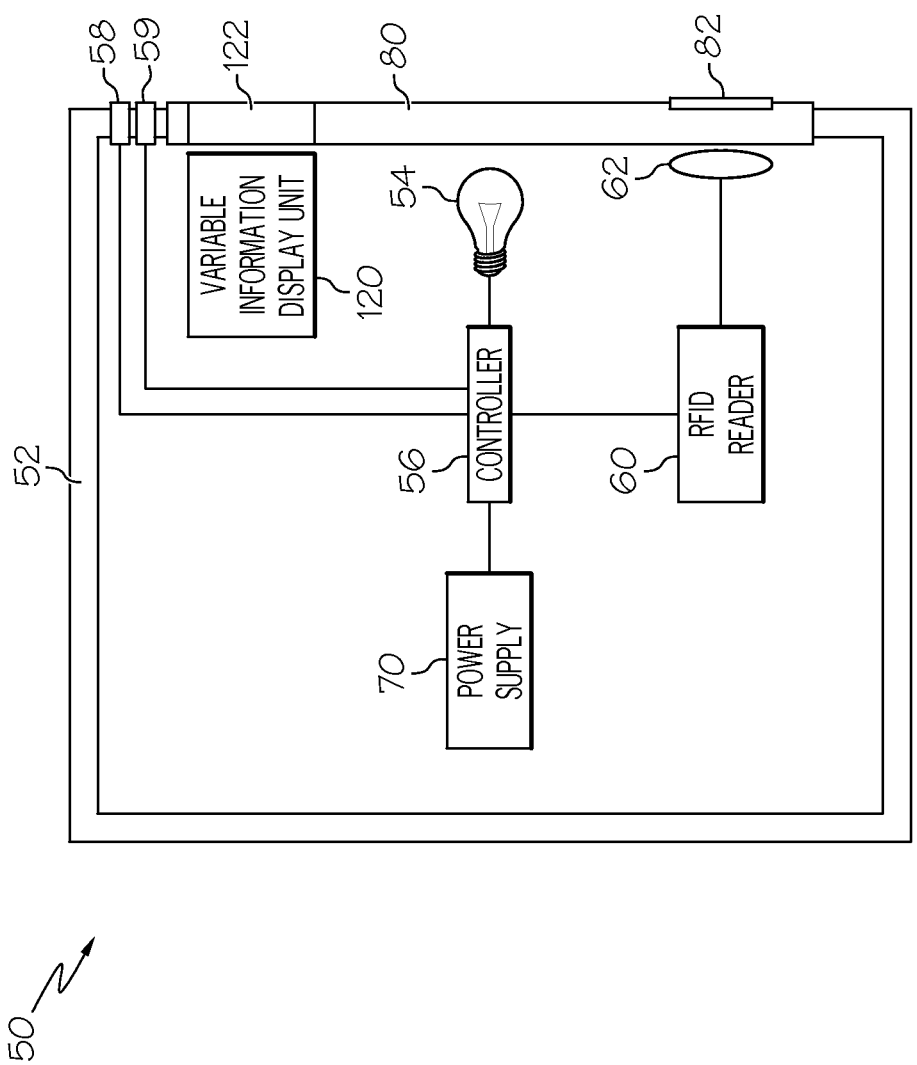
FIG. 7 is a diagrammatic illustration showing an exemplary display configuration in accordance with aspects of the present inventive subject matter, including an optional variable information display unit.

With reference now to FIG. 7, in still another embodiment, the sign 50 optionally includes an alphanumeric of other like electronic display unit 120, e.g., to output variable data or information. For example, the display unit 120 is optionally implemented as an LCD or other electrophoretic display suitable for outputting variable information. In practice, the media 80 is optionally provisioned with an aperture or clear transmissive window 122 through which the variable information on display unit 120 can be viewed. Suitably, the variable information display unit 120 and/or the content thereon may be controlled by the controller 56, e.g., in response to data or information obtained from the RFID device 82 by the reader 60.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate. For example, a single RFID device (such as the device 82) may optionally be provisioned with control logic or other like instructions for the operation of the sign 50, authentication data and NFC functionality. Alternately, a plurality of separate RFID or other like devices may be employed each provisioned to carry out one or more of the foregoing functions. For example, one RFID device could be provisioned with sign control logic or the like and authentication data, while a separate RFID could be provisioned to support the NFC functionality with regard to the viewers' devices.

It will thus be seen according to the present invention a highly advantageous graphic advertising system has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A method of using an advertising system, comprising the steps of:
   providing a frame having a backlighting illumination source, an RFID reader and a controller connected to the RFID reader;

producing a replaceable graphic medium, the graphic medium having
   at least one of advertising and marketing information provided on a surface thereof; and
   an RFID inlay, the RFID inlay having a chip encoded with product information and illumination instructions;
   wherein the replaceable graphic medium is transparent, semi-transparent, or translucent;
affixing the replaceable graphic medium to the frame;
sensing an individual near the frame;
varying the output of the illumination source with the controller in connection with the illumination instructions provided on the chip;
detecting a mobile communication device near the frame;
uploading at least a portion of the information encoded on the chip on the RFID inlay to the mobile communication device; and
displaying information on the mobile communication device;
wherein the controller shuts off the light source if the RFID reader does not detect valid authentication data on the chip.

2. The method as recited in claim 1, wherein the step of displaying information includes providing an individual with an electronic product coupon.

3. The method as recited in claim 1, wherein the RFID inlay is adhered, laminated, embedded, or attached to a substrate of the replaceable graphic medium.

4. The method as recited in claim 1, wherein the step of uploading provides an individual with product information relating to the content of the graphic medium.

5. The method as recited in claim 1, wherein the step of producing a replaceable graphic medium is performed by one of printing, imaging, perforating or cutting to form a visual graphic.

6. The method as recited in claim 1, wherein the step of varying the output of the illumination source includes altering at least one of wavelength, color variation or combinations thereof.

7. A method of using an advertising system, comprising the steps of:
   providing a frame having an illumination source, an RFID reader and a controller connected to the RFID reader;
   producing a replaceable graphic medium, the graphic medium comprising:
      at least one of advertising and marketing information provided on a surface thereof; and
      an RFID inlay, the RFID inlay having a chip encoded with product information and illumination instructions;
   affixing the replaceable graphic medium to the frame;
   sensing an individual near the frame;
   varying the output of the illumination source with the controller in connection with the illumination instructions provided on the chip;
   detecting a mobile communication device near the frame;
   uploading at least a portion of the information encoded on the chip on the RFID inlay to the mobile communication device; and
   displaying information on the mobile communication device;
   wherein the illumination source provides light at a wavelength outside of the visible range;
   wherein the replaceable graphic medium includes a fluorescent material that glows or fluoresces in response to the light; and
   wherein the controller shuts off the light source if the RFID reader does not detect valid authentication data on the chip.

8. A method of using an advertising system, comprising the steps of:
   providing a frame having an illumination source, an RFID reader and a controller connected to the RFID reader;
   producing a replaceable graphic medium, the graphic medium comprising:
      a substrate selected from the group consisting of a paper, a metal foil, a metal film, and a polymeric film;
      an image on the substrate, the image formed by selectively perforating the substrate; and
      an RFID inlay, the RFID inlay having a chip encoded with product information and illumination instructions;
   affixing the replaceable graphic medium to the frame;
   sensing an individual near the frame;
   varying the output of the illumination source with the controller in connection with the illumination instructions provided on the chip;
   detecting a mobile communication device near the frame;
   uploading at least a portion of the information encoded on the chip on the RFID inlay to the mobile communication device; and
   displaying information on the mobile communication device;
   wherein the controller shuts off the light source if the RFID reader does not detect valid authentication data on the chip.

9. The method of claim 8, wherein the substrate is a paper.

10. The method of claim 8, wherein the substrate is a metal foil or a metal film.

11. The method of claim 8, wherein the substrate is a polymeric film.

12. The method of claim 5, wherein the step of producing the replaceable graphic medium is performed by perforating to form a visual graphic.

13. The method of claim 5, wherein the step of producing the replaceable graphic medium is performed by cutting to form a visual graphic.

14. The method of claim 3, wherein the substrate is a paper.

15. The method of claim 3, wherein the substrate is a metal foil or a metal film.

16. The method of claim 3, wherein the substrate is a polymeric film.

17. The method of claim 7, wherein the illumination source is a backlighting illumination source.

18. The method of claim 1, wherein
   the frame comprises a front panel, a template panel, and a rear panel;
   the front panel comprises a transparent portion through which the replaceable graphic medium may be viewed;
   the template panel comprises a viewing aperture and one or more magnetic fasteners, the viewing aperture being sized and configured to correspond with the transparent portion of the front panel; and
   the rear panel having one or more magnetic fasteners, the magnetic fasteners of the template panel and the rear panel being in alignment.

19. The method of claim 18, wherein the magnetic fasteners of the template panel and the magnetic fasteners of the rear panel comprise rare earth magnets.

20. The method of claim 18, wherein the template panel comprises one or more locking posts; and the rear panel comprises one or more keyhole slots aligned with the one or more locking posts.

* * * * *